US009909317B2

(12) United States Patent
Johnson et al.

(10) Patent No.: US 9,909,317 B2
(45) Date of Patent: *Mar. 6, 2018

(54) ROOFING SYSTEMS AND METHODS

(71) Applicant: JOHNS MANVILLE, Denver, CO (US)

(72) Inventors: Walter Alexander Johnson, Columbus, IN (US); Joel Evan Hazy, Brighton, CO (US); Duane Paradis, Highlands Ranch, CO (US); Christopher J Griffin, Aurora, CO (US); Raymond C Swann, Prairie Village, KS (US); Brad C Burdic, Littleton, CO (US)

(73) Assignee: Johns Manville, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/193,729

(22) Filed: Jun. 27, 2016

(65) Prior Publication Data

US 2016/0305126 A1    Oct. 20, 2016

Related U.S. Application Data

(60) Division of application No. 14/293,004, filed on Jun. 2, 2014, now Pat. No. 9,404,261, which is a (Continued)

(51) Int. Cl.
*E04D 1/28* (2006.01)
*B32B 5/02* (2006.01)
(Continued)

(52) U.S. Cl.
CPC .............. *E04D 3/351* (2013.01); *B29C 44/24* (2013.01); *B29C 44/326* (2013.01);
(Continued)

(58) Field of Classification Search
CPC ......... E04C 2/205; E04D 3/354; E04D 11/02; B32B 5/18
USPC .... 52/478, 796.1, 409, 309.1, 309.4, 309.11, 52/309.15, 410; 428/137, 138, 315.5, 428/315.9, 317, 318.8, 703
See application file for complete search history.

(56) References Cited

U.S. PATENT DOCUMENTS 3,111,787 A    11/1963    Chamberlain
3,138,251 A     6/1964    Olszyk et al.
(Continued)

FOREIGN PATENT DOCUMENTS

EP    0 787 069 B1    6/2002

OTHER PUBLICATIONS

Bomberg, et al, Spray Polyurethane Foam in External Envelopes of Buildings, 1998, pp. 177, 185, 186, CRC Press.
(Continued)

*Primary Examiner* — Chi Q Nguyen
(74) *Attorney, Agent, or Firm* — Robert D. Touslee

(57) ABSTRACT

According to one aspect, a roofing system comprises a plurality of insulation boards adapted for overlying a roof deck to form a layer of insulation. Each of the plurality of insulation boards has opposing planar surfaces and has a facer on at least one planar surface, and each of the plurality of insulation boards comprises polyisocyanurate foam having a first polyisocyanurate foam density. The roofing system further comprises a plurality of cover boards adapted for overlying the layer of insulation. Each of the plurality of cover boards has opposing planar surfaces and has a facer on at least one planar surface, and each of the plurality of cover boards comprises polyisocyanurate foam having a second polyisocyanurate foam density greater than the first polyisocyanurate foam density. The greater polyisocyanurate foam density provides for a compressive strength to resist deformation.

8 Claims, 8 Drawing Sheets

Related U.S. Application Data continuation of application No. 13/908,505, filed on Jun. 3, 2013, now abandoned, which is a division of application No. 13/209,710, filed on Aug. 15, 2011, now Pat. No. 8,479,467, which is a continuation-in-part of application No. 12/703,308, filed on Feb. 10, 2010, now Pat. No. 8,105,685, which is a continuation of application No. 11/519,042, filed on Sep. 11, 2006, now Pat. No. 7,811,663, which is a continuation-in-part of application No. 10/984,122, filed on Nov. 9, 2004, now abandoned.

(51) Int. Cl.

| | | |
|---|---|---|
| *E04D 3/35* | (2006.01) | |
| *E04C 2/296* | (2006.01) | |
| *B32B 5/18* | (2006.01) | |
| *B32B 7/02* | (2006.01) | |
| *E04C 2/284* | (2006.01) | |
| *B29D 99/00* | (2010.01) | |
| *E04C 2/20* | (2006.01) | |
| *B32B 27/32* | (2006.01) | |
| *B32B 27/40* | (2006.01) | |
| *B32B 27/42* | (2006.01) | |
| *B29C 44/24* | (2006.01) | |
| *B29C 44/32* | (2006.01) | |
| *B32B 5/24* | (2006.01) | |
| *E04D 3/18* | (2006.01) | |
| *B29K 75/00* | (2006.01) | |
| *B32B 38/00* | (2006.01) | |

(52) U.S. Cl.
CPC ............ *B29D 99/001* (2013.01); *B32B 5/022* (2013.01); *B32B 5/18* (2013.01); *B32B 5/24* (2013.01); *B32B 7/02* (2013.01); *B32B 27/32* (2013.01); *B32B 27/40* (2013.01); *B32B 27/42* (2013.01); *E04C 2/205* (2013.01); *E04C 2/284* (2013.01); *E04C 2/296* (2013.01); *E04D 3/18* (2013.01); *E04D 3/352* (2013.01); *E04D 3/354* (2013.01); *B29K 2075/00* (2013.01); *B32B 2038/0084* (2013.01); *B32B 2262/101* (2013.01); *B32B 2307/72* (2013.01); *B32B 2419/06* (2013.01); *Y10T 156/10* (2015.01); *Y10T 428/24331* (2015.01); *Y10T 428/24967* (2015.01); *Y10T 428/24992* (2015.01); *Y10T 428/24998* (2015.04); *Y10T 428/249953* (2015.04); *Y10T 428/249987* (2015.04); *Y10T 428/249989* (2015.04)

(56) References Cited

U.S. PATENT DOCUMENTS

| | | | |
|---|---|---|---|
| 3,223,576 A | 12/1965 | Evans et al. | |
| 3,284,980 A | 11/1966 | Dinkel | |
| 3,332,386 A | 7/1967 | Massac | |
| 3,468,086 A | 9/1969 | Warner | |
| 3,677,874 A | 7/1972 | Sterrett et al. | |
| 3,763,614 A | 10/1973 | Hyde et al. | |
| 3,991,252 A | 11/1976 | Kolakowski et al. | |
| 4,021,981 A | 5/1977 | Van Wagoner | |
| 4,351,138 A | 9/1982 | McMillan et al. | |
| 4,357,377 A | 11/1982 | Yamamoto | |
| 4,450,663 A | 5/1984 | Watkins | |
| 4,459,334 A | 7/1984 | Blanpied et al. | |
| 4,469,731 A | 9/1984 | Saracino | |
| 4,564,554 A | 1/1986 | Mikuski | |
| 4,670,071 A | 6/1987 | Cooper et al. | |
| 4,677,800 A | 7/1987 | Roodvoets | |
| 4,680,909 A | 7/1987 | Stewart | |
| 4,706,435 A | 11/1987 | Stewart | |
| 4,726,973 A | 2/1988 | Thompson | |
| 4,874,648 A | 10/1989 | Hill et al. | |
| 4,936,070 A | 6/1990 | Michaud | |
| 4,965,977 A | 10/1990 | White | |
| 4,992,315 A | 2/1991 | Zickell et al. | |
| 4,996,803 A | 3/1991 | Karrfalt et al. | |
| 5,069,950 A | 12/1991 | Crookston | |
| 5,251,416 A | 10/1993 | White | |
| 5,349,804 A | 9/1994 | Van Erden et al. | |
| 5,373,674 A | 12/1994 | Winter, IV | |
| 5,394,672 A | 3/1995 | Seem | |
| 5,403,645 A | 4/1995 | Stein et al. | |
| 5,433,050 A | 7/1995 | Wilson et al. | |
| 5,580,367 A | 12/1996 | Fife | |
| 5,580,637 A | 12/1996 | Konta et al. | |
| 5,695,870 A * | 12/1997 | Kelch | B32B 5/18 428/317.1 |
| 5,772,816 A | 6/1998 | Hubbard | |
| 5,882,776 A | 3/1999 | Bambara et al. | |
| 5,891,563 A * | 4/1999 | Letts | B29C 44/326 428/140 |
| 5,927,032 A | 7/1999 | Record | |
| 6,044,604 A * | 4/2000 | Clayton | E04C 2/246 52/309.9 |
| 6,055,786 A | 5/2000 | Hubbard et al. | |
| 6,093,481 A * | 7/2000 | Lynn | B32B 5/20 428/217 |
| 6,117,375 A * | 9/2000 | Garrett | B29C 44/30 156/247 |
| 6,238,502 B1 | 5/2001 | Hubbard | |
| 6,308,482 B1 | 10/2001 | Strait | |
| 6,715,249 B2 | 4/2004 | Rusek et al. | |
| 6,777,063 B2 | 8/2004 | Born | |
| 7,028,438 B2 | 4/2006 | Burdic | |
| 7,107,731 B2 | 9/2006 | Record | |
| 7,430,837 B2 | 10/2008 | Hubbard | |
| 7,607,271 B2 | 10/2009 | Griffin et al. | |
| 7,625,827 B2 | 12/2009 | Egan et al. | |
| 7,658,045 B2 | 2/2010 | Elliott et al. | |
| 7,718,253 B2 | 5/2010 | Griffin et al. | |
| 7,735,279 B2 | 6/2010 | Paradis et al. | |
| 7,749,598 B2 | 7/2010 | Agrawal | |
| 7,765,761 B2 | 8/2010 | Paradis | |
| 7,785,703 B2 | 8/2010 | Agrawal | |
| 7,811,663 B2 | 10/2010 | Paradis et al. | |
| 7,972,688 B2 | 7/2011 | Letts et al. | |
| 8,105,685 B2 | 1/2012 | Paradis et al. | |
| 8,156,700 B2 | 4/2012 | Umlor | |
| 8,287,997 B2 | 10/2012 | Paradis et al. | |
| 8,426,017 B2 | 4/2013 | Paradis et al. | |
| 8,453,390 B2 | 6/2013 | Letts et al. | |
| 8,470,436 B1 | 6/2013 | Paradis et al. | |
| 8,479,467 B2 | 7/2013 | Johnson et al. | |
| 8,484,922 B2 | 7/2013 | Lee et al. | |
| 8,584,405 B2 | 11/2013 | Broden | |
| 8,597,779 B2 | 12/2013 | Paradis et al. | |
| 8,617,699 B2 | 12/2013 | Paradis et al. | |
| 8,656,675 B2 | 2/2014 | Lee et al. | |
| 8,763,330 B2 | 7/2014 | Pollack | |
| 8,833,028 B2 | 9/2014 | Whispell et al. | |
| 8,863,442 B2 | 10/2014 | Freeman | |
| 2002/0155274 A1 | 10/2002 | Ramesh et al. | |
| 2002/0155305 A1 | 10/2002 | Peuramaki | |
| 2003/0082365 A1 | 5/2003 | Geary et al. | |
| 2003/0186045 A1 | 10/2003 | Wardle et al. | |
| 2004/0001945 A1 | 1/2004 | Cate et al. | |
| 2004/0109983 A1 | 6/2004 | Rotter et al. | |
| 2004/0200154 A1 | 10/2004 | Hunter, Jr. | |
| 2004/0226247 A1 | 11/2004 | Byrd | |
| 2005/0106379 A1* | 5/2005 | Workman | B32B 5/18 428/318.4 |
| 2005/0144850 A1 | 7/2005 | Hageman | |
| 2006/0096205 A1 | 5/2006 | Griffin et al. | |
| 2006/0096213 A1* | 5/2006 | Griffin | E04C 2/296 52/409 |
| 2006/0127664 A1 | 6/2006 | Geary et al. | |
| 2006/0179749 A1 | 8/2006 | Brandt et al. | |
| 2006/0260237 A1 | 11/2006 | Griffin et al. | |

(56) References Cited

U.S. PATENT DOCUMENTS

| | | |
|---|---|---|
| 2006/0275561 A1 | 12/2006 | Agrawal |
| 2006/0276093 A1 | 12/2006 | Agrawal |
| 2007/0022711 A1 | 2/2007 | Paradis et al. |
| 2009/0269565 A1 | 10/2009 | Peng |
| 2009/0320383 A1 | 12/2009 | Taylor et al. |
| 2010/0189977 A1 | 7/2010 | Griffin et al. |
| 2010/0313514 A1 | 12/2010 | Paradis et al. |
| 2011/0131910 A1 | 6/2011 | Paradis et al. |
| 2012/0196106 A1 | 8/2012 | Paradis et al. |
| 2014/0033627 A1* | 2/2014 | Stephens, Jr. ............ E04C 2/52 52/204.5 |

OTHER PUBLICATIONS

Roofing Contractor, What's the Deal with Cover Boards?, Jul. 2, 2001.

Szycher PhD., Michael, Szycher's Handbook of Polyurethanes, 1999, pp. 8.2-8.6, CRC Press LLC.

Use of Cover Boards Over Polyisocyanurate Roof Insulation, Bulletin 2000-3, Mar. 2000.

Hogan, Lyle D., Using Two Layers of Insulation in Single-Ply Roof Systems, Jun. 2001.

Handbook of Plastic Foams, 1995, Index and pp. 70-120, Noyes Publications, Park Ridge, New Jersey, USA.

2001 Low-Slope Roofing Materials Guide, Table of Contents and Section 2, Rigid Insulation, pp. 419-480, National Roofing Contractors Association, Rosemont, IL.

U.S. Appl. No. 10/020,826, filed Oct. 30, 2001, Geary et al.

* cited by examiner

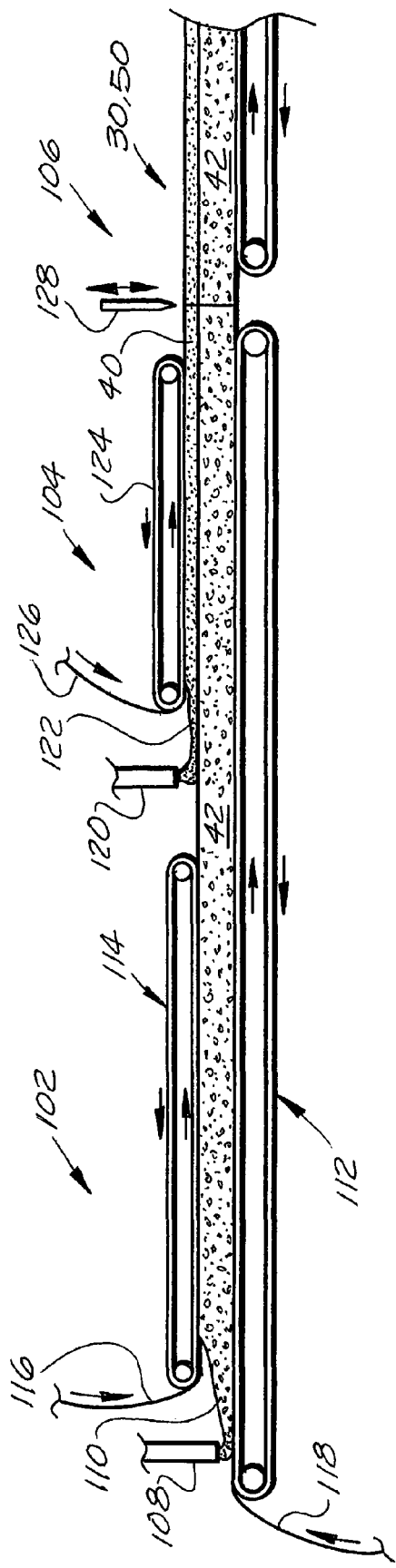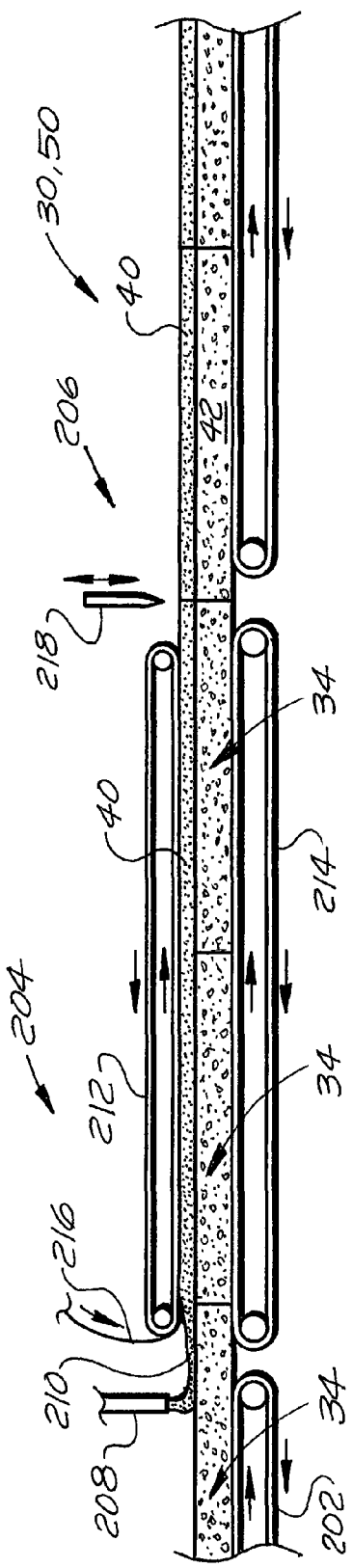

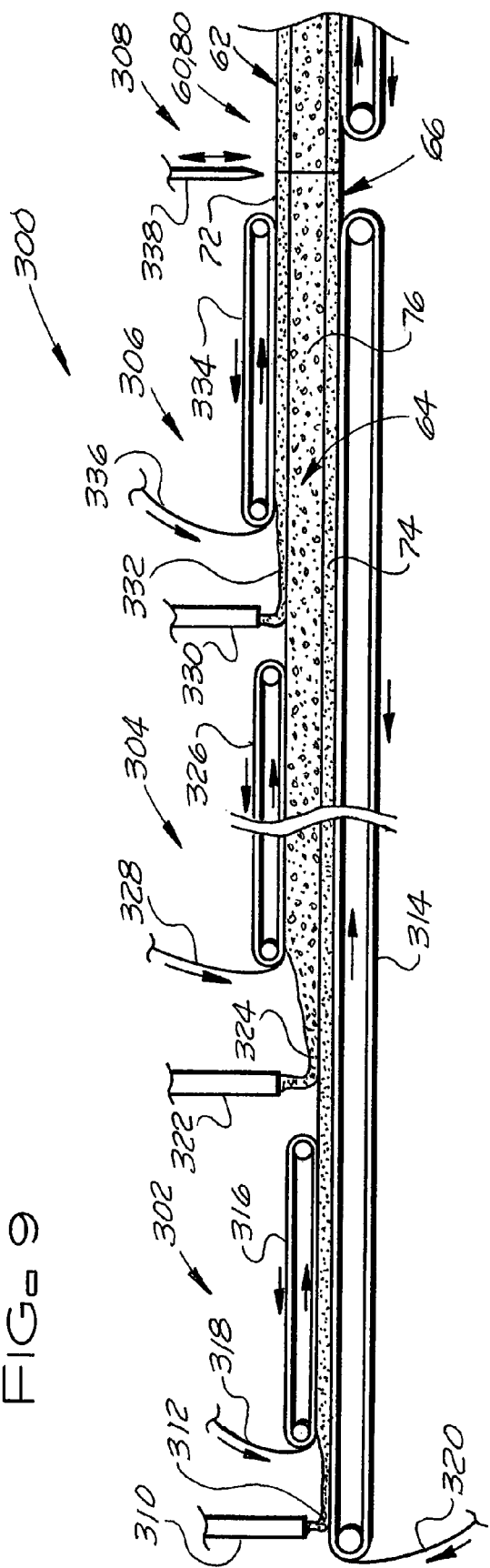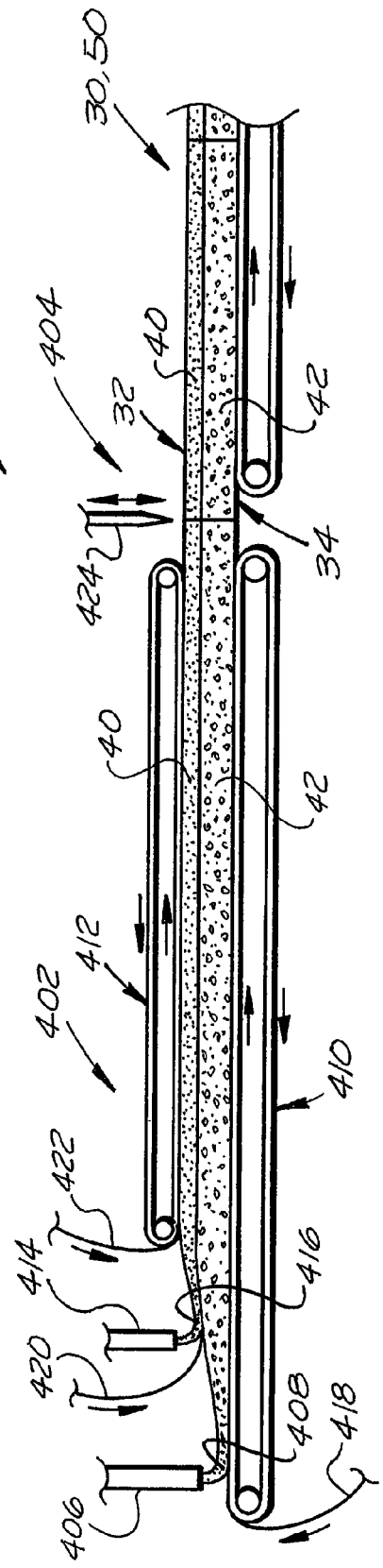

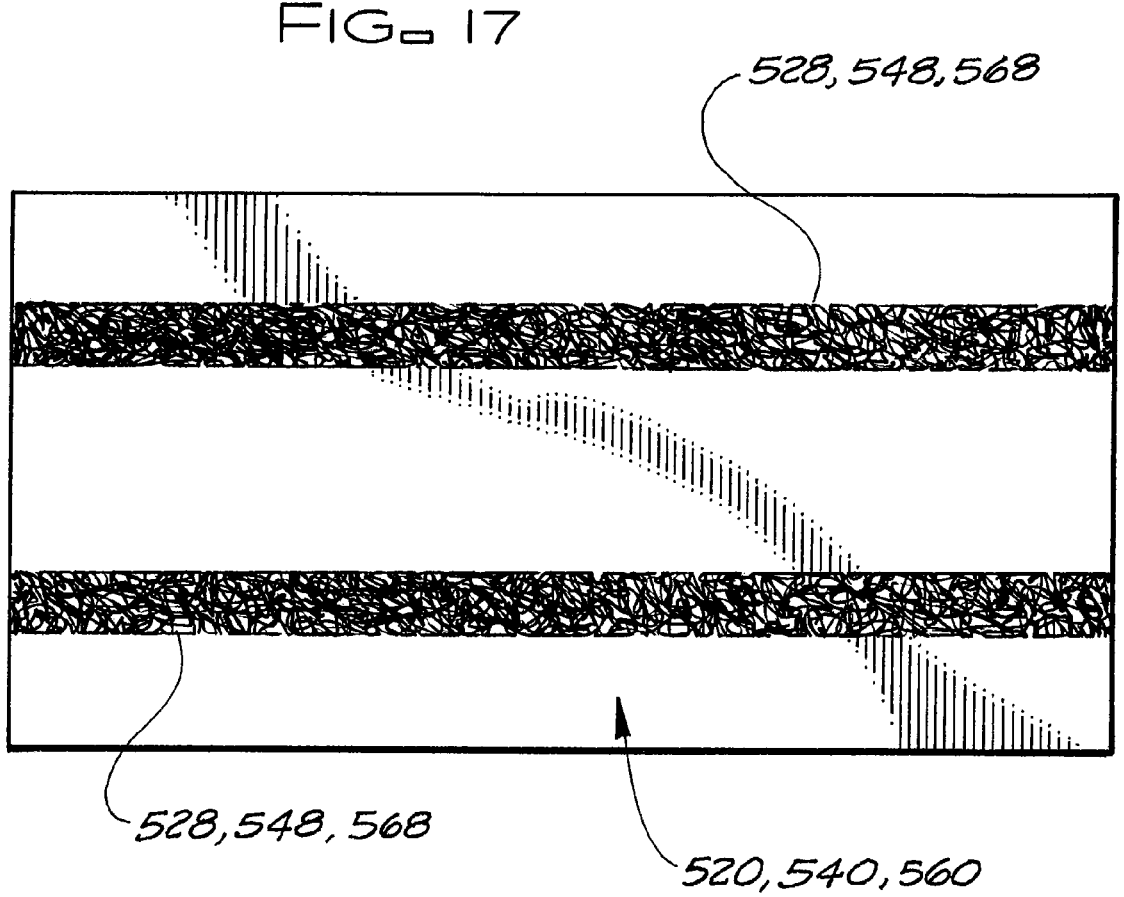

ROOFING SYSTEMS AND METHODS

CROSS-REFERENCE TO RELATED APPLICATIONS

This patent application is a divisional of pending U.S. patent application Ser. No. 14/293,004, filed Jun. 2, 2014; U.S. patent application Ser. No. 14/293,004 is a continuation of U.S. patent application Ser. No. 13/908,505, filed Jun. 3, 2013 and titled "Prefabricated Roofing Panel Composite", now abandoned; U.S. patent application Ser. No. 13/908,505 is a division of U.S. patent application Ser. No. 13/209,710, filed Aug. 15, 2011 and titled "Prefabricated Roofing Panel Composite", (now U.S. Pat. No. 8,479,467); U.S. Pat. No. 8,479,467 is a continuation-in-part of U.S. patent application Ser. No. 12/703,308, filed Feb. 10, 2010 and titled "Roofing Cover Board, Roofing Panel Composites and Method", (now U.S. Pat. No. 8,105,685); U.S. Pat. No. 8,105,685 is a continuation of U.S. patent application Ser. No. 11/519,042, filed Sep. 11, 2006 and titled "Roofing Cover Board, Roofing Panel Composites, and Method" (now U.S. Pat. No. 7,811,663); U.S. Pat. No. 7,811,663 is a continuation-in-part of U.S. patent application Ser. No. 10/984,122, filed Nov. 9, 2004 and titled "Roofing Cover Board, Roofing Panel Composite, and Method" (now abandoned), the entire disclosures of which are hereby incorporated by reference herein for all purposes.

BACKGROUND OF THE INVENTION

The subject invention relates to low-slope roofs that are typically found on commercial and industrial buildings and in particular to prefabricated high-density polymer or predominantly polymer material cover boards and cover board composites and prefabricated roofing panel composites which include high-density polymer or predominantly polymer material cover boards and low-density polymer or predominantly polymer material foam insulation boards, for use on such low-slope roofs and to a method of making the cover boards, the cover board composites, and the roofing panel composites.

Commercial and industrial buildings typically have roofs with low-slope roof decks. The roofing systems for these roofs with low-slope roof decks typically include one or more layers of a low-density roofing insulation, a layer of roofing cover boards that overlie the low-density roofing insulation layer(s), and a waterproofing membrane that overlies the layer of cover boards. The layer(s) of low-density insulation, such as a low-density polymer-based foam insulation, if not protected, can be partially crushed or otherwise damaged from worker traffic over the insulation, the placement of heaving objects on the insulation, the weather, and other causes commonly encountered in roofing construction. The layer of roofing cover boards that overlies the one or more layers of low-density insulation, protects the more fragile low density insulation from damage, acts as a fire barrier, provides a suitable substrate for the attachment of the overlying waterproofing membrane, and augments the insulating function of the low-density insulation. The uppermost waterproofing membrane layer overlying the cover board layer protects the underlying cover board and insulation layers from moisture and other adverse climatic conditions. Normally, these three components (the low-density insulation boards, the roofing cover boards, and the waterproofing membrane) of the roofing system are separately manufactured and separately and successively applied to the low-slope roof deck.

While these roofing systems function very well, there has remained a need to provide improved roofing cover boards and prefabricated cover board composites and to provide prefabricated roofing panel composites that include at least an insulation board and the improved roofing cover board, and that, preferably, include an insulation board and prefabricated the roofing cover board composite having a waterproofing membrane. With the use of such improved roofing cover boards and cover board composites and prefabricated roofing panel composites, roofing systems for low-slope roof decks can be improved and/or the time, labor, and other costs associated with the installation of roofing systems on low-slope roof decks can be reduced. The subject invention provides improved roofing cover boards, improved prefabricated roofing cover board and waterproofing membrane composites, improved prefabricated roofing panel cover board and insulation board composites, improved prefabricated roofing panel cover board, insulation board, and waterproofing membrane composites, and improved prefabricated roofing panel cover board, insulation board, baseboard, and waterproofing membrane composites. The subject invention also provides these roofing cover boards, roofing cover board composites, and roofing panel composites with reinforcing patches or strips that increase the per fastener wind uplift pull through rating for the cover boards, cover board composites, and roofing panel composites to thereby further reduce the labor and ultimately the overall installed cost of roofing systems utilizing these cover boards, cover board composites, and roofing panel composites. The subject invention also provides a method for making the improved roofing cover board and the prefabricated roofing panel composites including the improved roofing cover board that is highly productive, relatively economical, and efficient.

SUMMARY OF THE INVENTION

According to one aspect, a roofing system comprises a plurality of insulation boards adapted for overlying a roof deck to form a layer of insulation. Each of the plurality of insulation boards comprises a first polyisocyanurate foam having a first polyisocyanurate foam density. The roofing system further comprises a plurality of cover boards adapted for overlying the layer of insulation. Each of the plurality of cover boards comprises a second polyisocyanurate foam having a second polyisocyanurate foam density, and the second polyisocyanurate foam density is greater than the first polyisocyanurate foam density. In some embodiments, each of the plurality of insulation boards has opposing top and bottom major surfaces and comprises a facer on at least one of the major surfaces of the insulation board, and each of the plurality of cover boards has opposing top and bottom major surfaces and comprises a facer on at least one of the major surfaces of the cover board. The second polyisocyanurate foam density may be selected to provide the cover boards with a compressive strength to resist deformation. The second polyisocyanurate foam density may be between 6 lbs/ft$^3$ and 25 lbs/ft$^3$. The second polyisocyanurate foam density may be between 4 lbs/ft$^3$ and 25 lbs/ft$^3$. In some embodiments, each of the plurality of cover boards has a thickness, and the thickness and the second polyisocyanurate foam density are selected to provide the cover boards with a compressive strength to resist deformation and protect low-density insulation layers overlaid by the cover board from damage. In some embodiments, each of the plurality of cover boards is bonded to a respective one of the plurality of insulation boards to form a roofing panel composite. The roofing system may further comprise a waterproofing membrane adapted for overlying the layer of cover boards.

According to another aspect, a roofing system comprises a plurality of insulation boards adapted for overlying a roof deck to form a layer of insulation. Each of the plurality of insulation boards has opposing planar surfaces and has a facer on at least one planar surface, and each of the plurality of insulation boards comprises polyisocyanurate foam having a first polyisocyanurate foam density. The roofing system further comprises a plurality of cover boards adapted for overlying the layer of insulation. Each of the plurality of cover boards has opposing planar surfaces and has a facer on at least one planar surface, and each of the plurality of cover boards comprises polyisocyanurate foam having a second polyisocyanurate foam density greater than the first polyisocyanurate foam density. The greater polyisocyanurate foam density provides for a compressive strength to resist deformation. The second polyisocyanurate foam density may be between 6 lbs/ft$^3$ and 25 lbs/ft$^3$. The second polyisocyanurate foam density may be between 4 lbs/ft$^3$ and 25 lbs/ft$^3$. The first polyisocyanurate foam density may be less than 4 lbs/ft$^3$. The first polyisocyanurate foam density may be between about 1 lbs/ft$^3$ and about 3 lbs/ft$^3$. In some embodiments, the facers comprise glass fiber. In some embodiments, each of the plurality of cover boards is bonded to a respective one of the plurality of insulation boards to form a roofing panel composite. In some embodiments, the roofing system further comprises a waterproofing membrane adapted for overlying the layer of cover boards.

According to another aspect, a method of constructing a roof comprises receiving a plurality of insulation boards and a plurality of cover boards as recited above, and installing at least some of the insulation boards and at least some of the cover boards on the roof.

According to another aspect, a roofing system comprises a plurality of insulation boards adapted for overlying a roof deck to form a layer of insulation. Each of the plurality of insulation boards comprises a first polyisocyanurate or predominantly polyisocyanurate foam material having a first foam density. The roofing system further comprises a plurality of cover boards adapted for overlying the layer of insulation, each of the plurality of cover boards comprising a second polyisocyanurate or predominantly polyisocyanurate foam material having a second foam density. The second foam density is greater than the first foam density, and the greater foam density provides for a compressive strength to resist deformation. In some embodiments, each of the plurality of insulation boards has opposing top and bottom major surfaces and comprises a facer on at least one of the major surfaces of the insulation board, and each of the plurality of cover boards has opposing top and bottom major surfaces and comprises a facer on at least one of the major surfaces of the cover board. The second foam density may be between 6 lbs/ft$^3$ and 25 lbs/ft$^3$. The second foam density may be between 4 lbs/ft$^3$ and 25 lbs/ft$^3$. In some embodiments, each of the plurality of cover boards is bonded to a respective one of the plurality of insulation boards to form a roofing panel composite. In some embodiments, the roofing system further comprises a waterproofing membrane adapted for overlying the layer of cover boards.

BRIEF DESCRIPTION OF THE DRAWINGS

FIG. 7 is a schematic side view of a first production line that can be used with the method of the subject invention to make a prefabricated roofing panel composite of the subject invention that includes a high-density polymer or predominantly polymer material cover board and a low-density polymer or predominantly polymer material foam insulation board.

FIG. 8 is a schematic side view of a second production line that can be used with the method of the subject invention to make a prefabricated roofing panel composite of the subject invention that includes a high-density polymer or predominantly polymer material cover board and a low-density polymer or predominantly polymer material foam insulation board.

FIG. 9 is a schematic side view of a production line that can be used with the method of the subject invention to make a prefabricated roofing panel composite of the subject invention that includes a high-density polymer or predominantly polymer material cover board, a low-density polymer or predominantly polymer material foam insulation board, and a high-density polymer or predominantly polymer material baseboard.

FIG. 10 is a schematic side view of a third production line that can be used with the method of the subject invention to make a prefabricated roofing panel composite of the subject invention that includes a high-density polymer or predominantly polymer material cover board and a low-density polymer or predominantly polymer material foam insulation board.

FIG. 17 is a schematic bottom view of the prefabricated cover board, cover board/insulation board panel, or cover board/insulation board/baseboard panel composites of FIGS. 11 to 14, with the bottom facer removed, to show a reinforcement strip pattern for increasing the fastener wind-uplift pull through rating of the composites.

DESCRIPTION OF THE PREFERRED EMBODIMENTS

Figure 1:
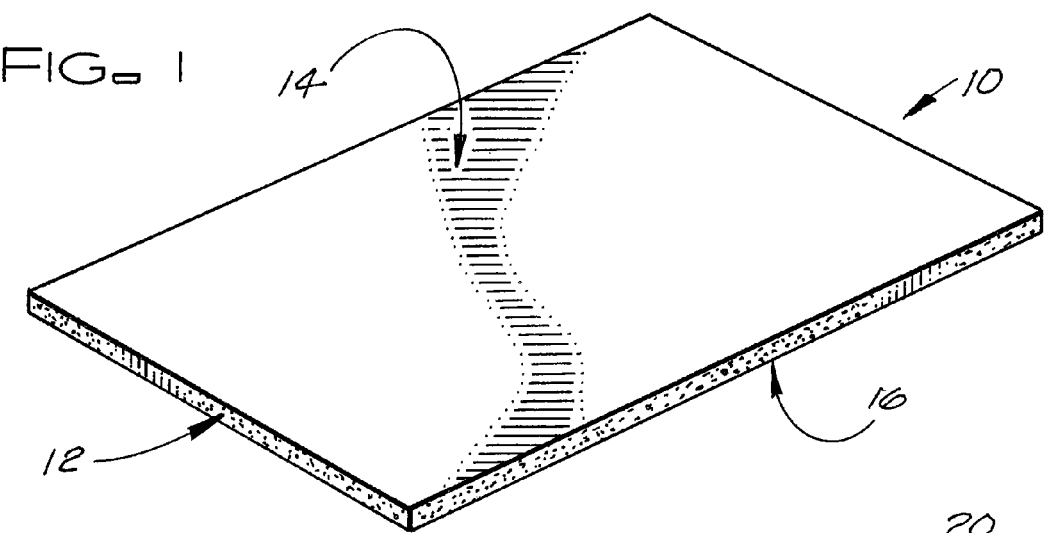
FIG. 1 is a schematic perspective view of a prefabricated high-density polymer or predominantly polymer material cover board of the subject invention.

FIG. 1 is a schematic perspective view of the cover board 10 of the subject invention, which has a high-density polymer or predominantly polymer material core layer 12. The high-density polymer or predominantly polymer material core layer 12 of the cover board 10 has a density of at least 4 lbs/ft$^3$ and preferably between 6 lbs/ft$^3$ and 25 lbs/ft$^3$. The high-density polymer or predominantly polymer material core layer 12 of the cover board 10 has a thickness of about 0.08 inches or greater and, preferably, a thickness between about 0.25 inches and about 0.75 inches. The density and thickness of the high-density polymer or predominantly polymer material core layer 12 of the cover board 10 are selected to provide the cover board with the compressive strength to resist deformation and protect low-density insulation layers overlaid by the cover board from damage, and to provide surface characteristics that promote the bonding of a top facer, e.g. a waterproofing membrane, to the high-density core layer of the cover board.

The high-density polymer or predominantly polymer material core layer 12 has a top major surface 14 and a bottom major surface 16 that are each defined by the length and the width of the high-density polymer or predominantly polymer material core layer. The high-density polymer or predominantly polymer material core layer 12 typically has a width of about four feet or greater and a length of about four feet or greater, preferably, about eight feet or greater and could have lengths that are limited only by the ability to store, transport, and handle the high-density polymer or predominantly polymer material cover board 10 prior to installation.

The cover board 10 may have top and/or bottom facers that are not shown in FIG. 1. When used, the top and/or bottom facers typically overlie the entire or substantially the entire major surface 14 and/or 16 of the high-density polymer or predominantly polymer material core layer 12 to which the facers are bonded. The top and bottom facers of the high-density polymer or predominantly polymer material cover board 10 may be any sheet material that provides suitable top and bottom major surfaces for the cover board, such as but not limited to paper, foil, woven or nonwoven mats made of fiberglass or other fibers or filaments, scrims, etc.

The high-density polymer or predominantly polymer material core layer 12 of the cover board 10 may be made of various high-density polymer or predominantly polymer materials [e.g. a high-density polyisocyanurate, polyurethane, polystyrene, or phenolic material or a high-density material made of a blend of these materials; a high-density polyisocyanurate, polyurethane, polystyrene, or phenolic foam material or a high-density foam material made of a blend of these materials; a high-density predominantly polyisocyanurate, polyurethane, polystyrene, or phenolic material with up to 40% by weight, but typically between about 1% and about 25% by weight organic and/or inorganic filler(s) or a high-density material made of a blend of these materials with up to 40% by weight, but typically between about 1% and about 25% by weight organic and/or inorganic filler(s); a high-density predominantly polyisocyanurate, polyurethane, polystyrene, or phenolic foam material with up to 40% by weight, but typically between about 1% and about 25% by weight organic and/or inorganic filler(s) or a high-density foam material made of a blend of these materials with up to 40% by weight, but typically between about 1% and about 25% by weight organic and/or inorganic filler(s), a high-density material made of other thermoset matrix polymers; etc.]. However, a preferred material for the high-density core layer 12 is a high-density polyisocyanurate or predominantly polyisocyanurate material or foam material with up to 40% by weight, but typically between about 1% and about 25% by weight organic and/or inorganic. Examples of various fillers that may be used in the predominantly polymer materials of the high-density core layer 12 include but are not limited to powdered, liquid, and fiber fillers. The high-density polymer and predominantly polymer materials of the core layer 12 may also include fiber reinforcements, fungi growth-inhibiting agents, and fire-retardants to reduce the cost of and/or modify the properties of the high-density core layer 12, such as but not limited to the compressive strength, the toughness, the flexibility, the friability, and the fire resistance of the core layer. Examples of fillers that may be used in the high-density predominantly polymer material core layer 12 are fillers such as but not limited to limestone (CaCO$_3$), fiberglass, recycled polyisocyanurate dust, extenders/plasticizers, ground up foam insulation, ground up rubber, wood dust, etc.

The prefabricated high-density polymer or predominantly polymer material cover board of the subject invention is relatively lightweight and easily cut. This makes the cover board easier to install and increases the productivity of workers installing the cover boards. The high-density polymer or predominantly polymer material cover board of the subject invention does not support mold growth and the cover board is not negatively impacted by the application of solvents, hot asphalt, or adhesives.

Figure 2:
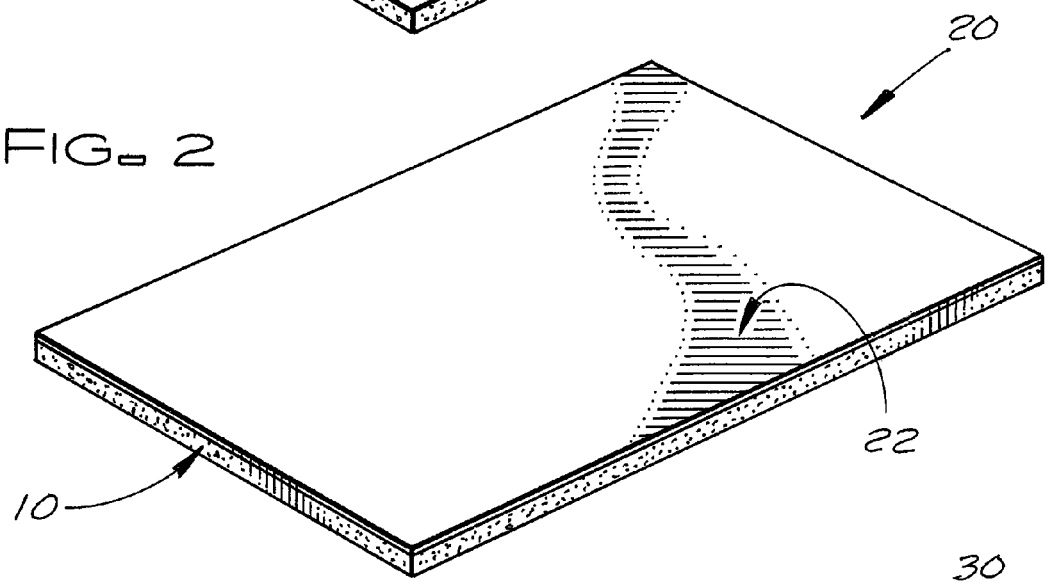
FIG. 2 is a schematic perspective view of a cover board composite of the subject invention that includes a prefabricated high-density polymer or predominantly polymer material cover board and a top facer.

FIG. 2 is a schematic perspective view of a prefabricated cover board and facer composite 20 of the subject invention. The composite 20 includes the cover board 10 and a facer 22, e.g. a waterproofing membrane. Other than the inclusion of a top facer 22, the prefabricated cover board and facer composite 20 is the same as the cover board 10 of FIG. 1.

The top facer 22 of the composite 20 may be any sheet material that provides a suitable top major surface for the cover board and facer composite, such as but not limited to coated or uncoated paper, foil, coated or uncoated woven or nonwoven mats made of fiberglass or other fibers or filaments, scrims, etc. A preferred sheet material for the top facer 22 is a nonwoven fiberglass mat that is heavily coated with a mineral coating such as but not limited to a calcium carbonate/clay/SBR latex coating. Where the composite 20 is fully adhered to an underlying roofing layer (e.g. an insulation layer) rather than being secured by mechanical fasteners, a sheet material may be used for the top facer 22 that serves the dual function of providing a facing during the manufacturing process and a waterproofing membrane on the finished product such as but not limited to a bituminous or modified bituminous membrane, or a single ply membrane (e.g. a EPDM, PVC, or TPO membrane). Where the top facer 22 is a waterproofing membrane, the facer may extend beyond the high-density polymer or predominantly polymer material core layer of the cover board 10 on one or more of the four sides of the core layer (e.g. beyond a side edge and an end edge of the top major surface of the core layer) to form membrane overlaps for sealing to the membranes of other composites 20. While not shown, the composite may also include a bottom facer that is bonded to the bottom major surface of the high-density polymer or predominantly polymer material core layer of the cover board. When used, the bottom facer of the composite 20 may be any sheet material that provides a suitable bottom major surface for the cover board and facer composite for bonding to an underlying layer of the roofing system, such as but not limited to coated or uncoated paper, coated or uncoated woven or nonwoven mats made of fiberglass or other fibers or filaments, scrims, etc.

Figure 3:
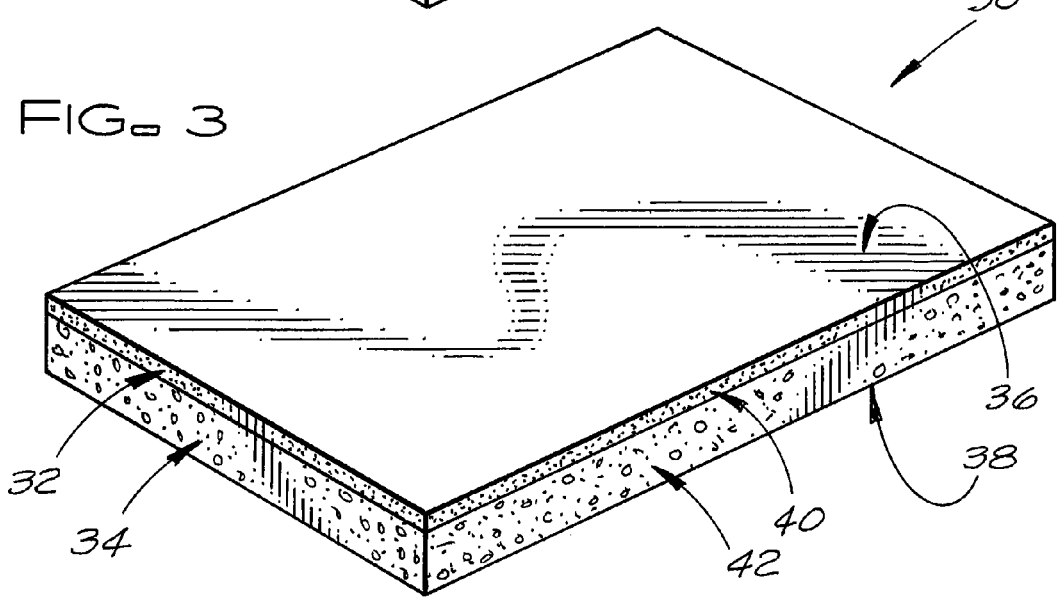
FIG. 3 is a schematic perspective view of a prefabricated roofing panel composite of the subject invention that includes a high-density polymer or predominantly polymer material cover board and a low-density polymer or predominantly polymer material foam insulation board.

FIG. 3 is a schematic perspective view of a first prefabricated roofing panel composite 30 of the subject invention. The prefabricated roofing panel composite 30 includes a high-density polymer or predominantly polymer material cover board 32 and an insulation board 34 that, as shown, are bonded directly together. The prefabricated roofing panel composite 30 has a top major surface 36 and a bottom major surface 38 that are each defined by the length and the width of the roofing panel composite. The prefabricated roofing panel composite 30 typically has a width of about four feet or greater and a length of about four feet or greater, preferably, about eight feet or greater and could have lengths that are limited only by the ability to store, transport and handle the roofing panel composites prior to installation.

In the prefabricated roofing panel composite 30, the cover board 32 has a high-density polymer or predominantly polymer material core layer 40. The high-density polymer or predominantly polymer material core layer 40 of the cover board 32 in the prefabricated roofing panel composite 30 has a density of at least 4 lbs/ft$^3$ and preferably, between 6 lbs/ft$^3$ and 25 lbs/ft$^3$. The high-density polymer or predominantly polymer material core layer 40 of the cover board 32 in the prefabricated roofing panel composite has a thickness of about 0.08 inches or greater and, preferably, a thickness between about 0.25 inches and about 0.75 inches. The density and thickness of the high-density polymer or predominantly polymer material core layer 40 of the cover board 32 are selected to provide the cover board with the compressive strength to resist deformation and protect the low-density insulation board 34 that is overlaid by the cover board from damage, and to provide surface characteristics that promote the bonding of a top facer, e.g. a waterproofing membrane, to the high-density core layer 40 of the cover board.

The insulation board 34 in the prefabricated roofing panel composite 30 includes a low-density polymer or predominantly polymer material foam core layer 42. The low-density polymer or predominantly polymer material foam core layer 42 of the insulation board 34 has a density less than 6 lbs/ft$^3$, preferably less than 4 lbs/ft$^3$, and typically a density of less than 2.5 lbs/ft$^3$. The low-density polymer or predominantly polymer material foam core layer 42 has a thickness of about 0.50 inches or greater and, preferably, a thickness between about 0.50 inches and about 6 inches. The density and thickness of the low-density polymer or predominantly polymer material foam core layer 42 of the insulation board 34 are selected to provide the prefabricated roofing panel composite 30 with the desired insulating properties for the roofing system application.

The high-density polymer or predominantly polymer material core layer 40 of the cover board 32 may be made of various high-density polymer or predominantly polymer materials [e.g. a high-density polyisocyanurate, polyurethane, polystyrene, or phenolic material or a high-density material made of a blend of these materials; a high-density polyisocyanurate, polyurethane, polystyrene, or phenolic foam material or a high-density foam material made of a blend of these materials; a high-density predominantly polyisocyanurate, polyurethane, polystyrene, or phenolic material with up to 40% by weight, but typically between about 1% and about 25% by weight organic and/or inorganic filler(s) or a high-density material made of a blend of these materials with up to 40% by weight, but typically between about 1% and about 25% by weight organic and/or inorganic fillers); a high-density predominantly polyisocyanurate, polyurethane, polystyrene, or phenolic foam material with up to 40% by weight, but typically between about 1% and about 25% by weight organic and/or inorganic filler(s) or a high-density foam material made of a blend of these materials with up to 40% by weight, but typically between about 1% and about 25% by weight organic and/or inorganic filler(s), a high-density material made of other thermoset matrix polymers; etc.]. However, a preferred material for the high-density core layer 40 is a high-density polyisocyanurate or predominantly polyisocyanurate material or foam material with up to 40% by weight, but typically between about 1% and about 25% by weight organic and/or filler(s) such as but not limited to those listed above in connection with the cover board 10.

The low-density polymer or predominantly polymer material foam core layer 42 of the insulation board 34 may be made of various low-density polymer or predominantly polymer foam materials [e.g. a low-density polyisocyanurate, polyurethane, polystyrene, or phenolic foam material or a low-density foam material made of a blend of these materials; a low-density predominantly polyisocyanurate, polyurethane, polystyrene, or phenolic foam material with up to 40% by weight, but typically between about 1% and about 25% by weight organic and/or inorganic filler(s) or a low-density foam material made of a blend of these materials with up to 40% by weight, but typically between about 1% and about 25% by weight organic and/or filler(s), a low-density foam material made of other thermoset matrix polymers; etc.]. However, a preferred material for the low-density core layer 42 is a low-density polyisocyanurate or predominantly polyisocyanurate foam material up to 40% by weight, but typically between about 1% and about 25% by weight organic and/or inorganic filler(s).

When the high-density core layer 40 is made of a predominantly polymer material, the high-density predominantly polymer material of the core layer 40 may contain various powdered, liquid, and fiber fillers, fiber reinforcements, fire-retardants, fungi growth-inhibiting agents, etc. to reduce the cost and/or modify the properties of the high-density core layer 40 (such as but not limited to the compressive strength, the flexibility, the friability, the fire resistance of the core layer). When the low-density core layer 42 is made of a predominantly polymer material foam, the low-density predominantly polymer material foam core layer 42 may contain various powdered, liquid, and fiber fillers, fiber reinforcements, fire-retardants, fungi growth-inhibiting agents, etc. to reduce the cost and/or modify the properties of the low-density predominantly polymer material foam core layer. Examples of fillers that may be used in the high-density core layer 40 of the cover board 32 and the low-density core layer 42 of the insulation board 34 are fillers such as but not limited to limestone ($CaCO_3$), fiberglass, recycled polyisocyanurate dust, extenders/plasticizers, ground up foam insulation, ground up rubber, wood dust, etc.

While, as shown in FIG. 3, the prefabricated roofing panel composite 30 has no facers, the prefabricated roofing panel composite 30 could have a common facer intermediate and bonded to both the bottom major surface of the cover board core layer 40 and the top major surface of the insulation board core layer 42, a top facer bonded to the top major surface of the cover board core layer 40, and/or a bottom facer bonded to the bottom major surface of the insulation board core layer 42. When used, the common facer of the prefabricated roofing panel composite 30 may be any sheet material with good bonding surfaces that facilitates a good bond between the cover board 32 and insulation board 34, such as but not limited to woven or nonwoven mats made of glass fibers, other fibers or filaments, scrims, etc. When used, the top facer of the prefabricated roofing panel composite 30 overlies the entire or substantially the entire top major surface of the high-density core layer 40 of the cover board 32. The top facer of the prefabricated roofing panel composite 30 may be any sheet material that provides a suitable top major surface for the prefabricated roofing panel composite 30, such as but not limited to coated or uncoated paper, foil, coated or uncoated woven or nonwoven mats made of fiberglass or other fibers or filaments, scrims, etc. When used, the bottom facer of the prefabricated roofing panel composite 30 overlies the entire or substantially the entire bottom surface of the low-density foam core layer 42 of the insulation board 34. The bottom facer of the prefabricated roofing panel composite 30 may be any sheet material that provides a suitable bottom major surface for the roofing panel composite 30, such as but not limited to coated or uncoated paper, foil, coated or uncoated woven or nonwoven mats made of fiberglass or other fibers or filaments, scrims, etc.

Figure 4:
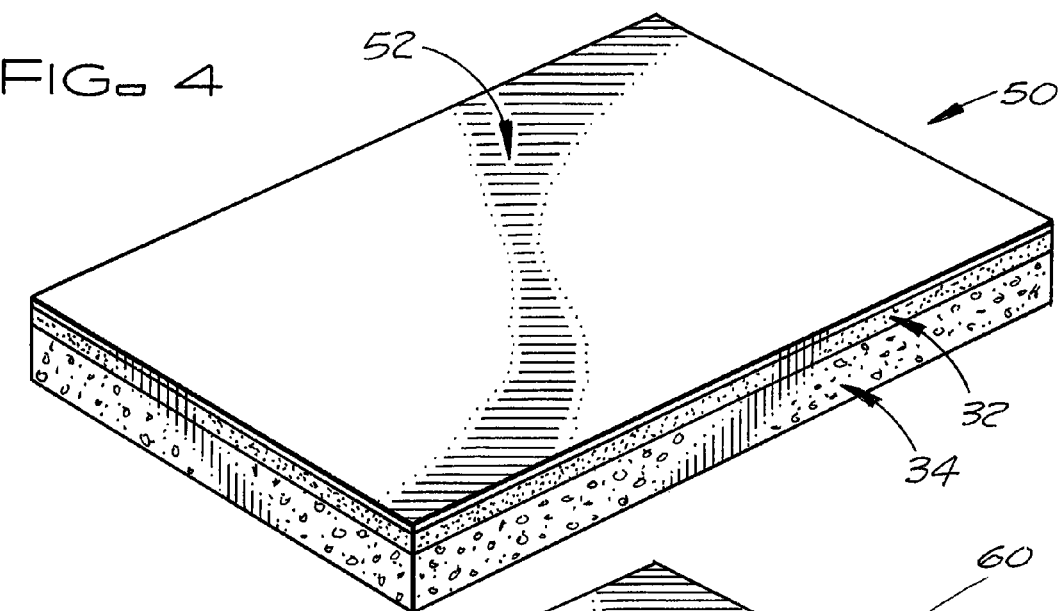
FIG. 4 is a schematic perspective view of a prefabricated roofing panel composite of the subject invention that includes a high-density polymer or predominantly polymer material cover board composite with a top facer and a low-density polymer or predominantly polymer material foam insulation board.

FIG. 4 is a schematic perspective view of a prefabricated roofing panel composite 50 of the subject invention. The prefabricated roofing panel composite 50 includes the high-density polymer or predominantly polymer material cover board 32 and the low-density polymer or predominantly polymer material foam insulation board 34 that, as shown in FIG. 4, are bonded directly together, and a top facer 52. Other than the inclusion of the top facer 52, the prefabricated roofing panel composite 50 is the same as the prefabricated roofing panel composite 30 of FIG. 3.

The top facer 52 of the prefabricated roofing panel composite 50 is bonded to and overlies the entire or substantially the entire top surface of the high-density polymer or predominantly polymer material core layer of the cover board 32. The top facer 52 of the prefabricated roofing panel composite 50 may be any sheet material that provides a suitable top major surface for the cover board of the prefabricated roofing panel composite 50, such as but not limited to coated or uncoated paper, foil, coated or uncoated woven or nonwoven mats made of fiberglass or other fibers or filaments, scrims, etc. A preferred sheet material for the top facer 52 is a nonwoven fiberglass mat that is heavily coated with a mineral coating such as but not limited to a calcium carbonate/clay/SBR latex coating. Where the prefabricated roofing panel composite 50 is fully adhered to an underlying roofing layer (e.g. an insulation layer) rather than being secured by mechanical fasteners, a sheet material may be used for the top facer 52 that serves the dual function of providing a facing during the manufacturing process and a waterproofing membrane on the finished product such as but not limited to a bituminous or modified bituminous membrane, or a single ply membrane (e.g. a EPDM, PVC, or TPO membrane). Where the top facer 52 is a waterproofing membrane, the facer may extend beyond the high-density core layer of the cover board 32 on one or more of the four sides of the core layer, e.g. beyond a side edge and an end edge of the top major surface of the core layer to provide overlaps for sealing with the membranes of adjacent panels.

While, as shown in FIG. 4, the prefabricated roofing panel composite 50 only has a top facer 52, the prefabricated roofing panel composite 50 could have a common facer intermediate and bonded to both the bottom major surface of the cover board 32 core layer 40 and the top major surface of the insulation board 34 core layer 42, and/or a bottom facer bonded to the bottom major surface of the insulation board 34 core layer 42. When used, the common facer of the prefabricated roofing panel composite 50 may be any sheet material with good bonding surfaces that facilitates a good bond between the cover board 32 and insulation board 34, such as but not limited to woven or nonwoven mats made of glass fibers, other fibers or filaments, scrims, etc. When used, the bottom facer of the prefabricated roofing panel composite 50 overlies the entire or substantially the entire bottom surface of the low-density foam core layer of the insulation board 34. The bottom facer of the prefabricated roofing panel composite 50 may be any sheet material that provides a suitable bottom major surface for the roofing panel composite 50, such as but not limited to coated or uncoated paper, foil, coated or uncoated woven or nonwoven mats made of fiberglass or other fibers or filaments, scrims, etc.

Figure 5:
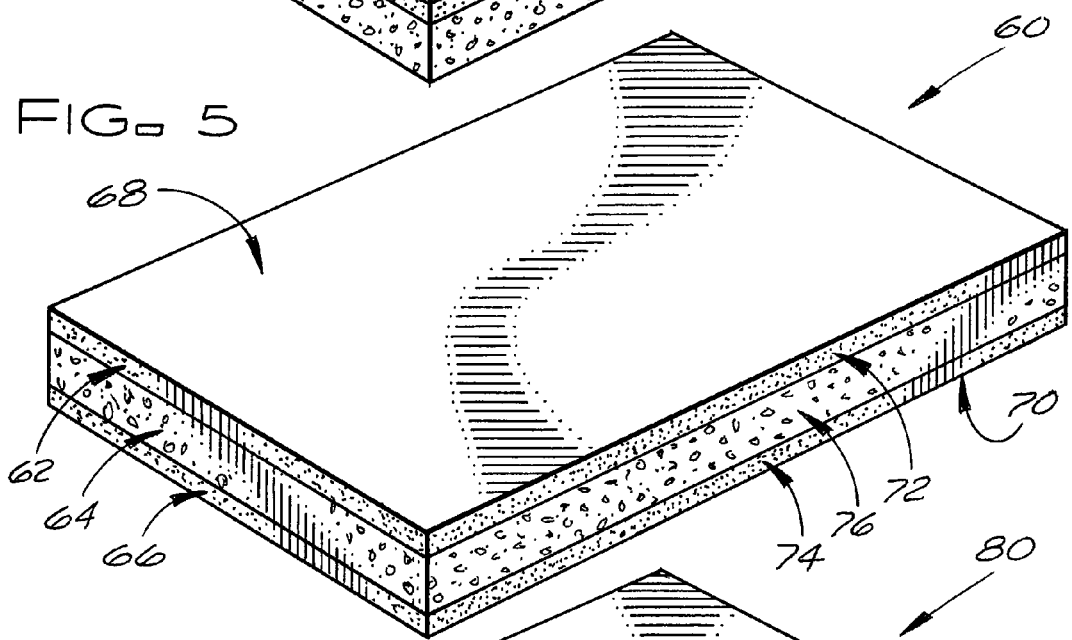
FIG. 5 is a schematic perspective view of a prefabricated roofing panel composite of the subject invention that includes a high-density polymer or predominantly polymer material cover board, a low-density polymer or predominantly polymer material foam insulation board, and a high-density polymer or predominantly polymer material baseboard.

FIG. 5 is a schematic perspective view of a prefabricated roofing panel composite 60 of the subject invention that includes: a high-density polymer or predominantly polymer material cover board 62, a low-density polymer or predominantly polymer material foam insulation board 64, and a high-density polymer or predominantly polymer material baseboard 66. The high-density polymer or predominantly polymer material cover board 62 and baseboard 66 may have the same density or different densities. As shown in FIG. 5, the cover board 62, the insulation board 64, and the baseboard 66 are bonded directly together. The prefabricated roofing panel composite 60 has a top major surface 68 and a bottom major surface 70 that are each defined by the length and the width of the prefabricated roofing panel composite. The prefabricated roofing panel composite 60 typically has a width of about four feet or greater and a length of about four feet or greater, preferably, about eight feet or greater and could have lengths that are limited only by the ability to store, transport and handle the roofing panel composites prior to installation.

In the prefabricated roofing panel composite 60, the cover board 62 has a high-density polymer or predominantly polymer material core layer 72 and the baseboard 66 has a high-density polymer or predominantly polymer material core layer 74. The high-density polymer or predominantly polymer material core layers 72 and 74 each have a density of at least 4 lbs/ft$^3$ and preferably, between 6 lbs/ft$^3$ and 25 lbs/ft$^3$. The high-density polymer or predominantly polymer material core layer 72 of the cover board 62 and the high-density polymer or predominantly polymer material core layer 74 of the baseboard 66 each have a thickness of about 0.08 inches or greater and, preferably, a thickness between about 0.25 inches and about 0.75 inches. The density and thickness of the high-density polymer or predominantly polymer material core layer 72 of the cover board 62 are selected to provide the cover board with the compressive strength to resist deformation and protect the low-density insulation board 64 that is overlaid by the cover board from damage, and to provide surface characteristics that promote the bonding of a top facer, e.g. a waterproofing membrane, to the core layer 72 of the cover board.

The insulation board 64 in the prefabricated roofing panel composite 60 includes a low-density polymer or predominantly polymer foam core layer 76. The low-density polymer or predominantly polymer material foam core layer 76 of the insulation board 64 has a density less than 6 lbs/ft$^3$, preferably less than 4 lbs/ft$^3$, and typically a density of less than about 2.5 lbs/ft$^3$. The low-density polymer or predominantly polymer material foam core layer 76 has a thickness of about 0.50 inches or greater and, preferably, a thickness between about 0.50 inches and about 6 inches. The density and thickness of the low-density polymer or predominantly polymer material foam core layer 76 of the insulation board 64 are selected to provide the prefabricated roofing panel composite 60 with the desired insulating properties for the roofing system application.

The high-density polymer or predominantly polymer material core layers 72 and 74 of the cover board 62 and the baseboard 66 may be made of various high-density polymer or predominantly polymer materials [e.g. a high-density polyisocyanurate, polyurethane, polystyrene, or phenolic material or a high-density material made of a blend of these materials; a high-density polyisocyanurate, polyurethane, polystyrene, or phenolic foam material or a high-density foam material made of a blend of these materials; a high-density predominantly polyisocyanurate, polyurethane, polystyrene, or phenolic material with up to 40% by weight, but typically between about 1% and about 25% by weight organic and/or inorganic filler(s) or a high-density material made of a blend of these materials with up to 40% by weight, but typically between about 1% and about 25% by weight organic and/or inorganic filler(s); a high-density predominantly polyisocyanurate, polyurethane, polystyrene, or phenolic foam material with up to 40% by weight, but typically between about 1% and about 25% by weight organic and/or inorganic filler(s) or a high-density foam material made of a blend of these materials with up to 40% by weight, but typically between about 1% and about 25% by weight organic and/or inorganic filler(s), a high-density material made of other thermoset matrix polymers; etc.]. However, a preferred material for the high-density core layers 72 and 74 is a high-density polyisocyanurate or predominantly polyisocyanurate material or foam material up to 40% by weight, but typically between about 1% and about 25% by weight organic and/or inorganic filler(s).

The low-density polymer or predominantly polymer material foam core layer 76 of the insulation board 64 may be made of various low-density polymer or predominantly polymer foam materials [e.g. a low-density polyisocyanurate, polyurethane, polystyrene, or phenolic foam material or a low-density foam material made of a blend of these materials; a low-density predominantly polyisocyanurate, polyurethane, polystyrene, or phenolic foam material with up to 40% by weight, but typically between about 1% and about 25% by weight organic and/or inorganic filler(s) or a low-density foam material made of a blend of these materials with up to 40% by weight, but typically between about 1% and about 25% by weight organic and/or inorganic filler(s), a low-density material made of other thermoset matrix polymers; etc.]. However, a preferred material for the low-density core layer 76 is a low-density polyisocyanurate or predominantly polyisocyanurate foam material up to 40% by weight, but typically between about 1% and about 25% by weight organic and/or inorganic filler(s).

When the high-density core layers 72 and 74 are made of a predominantly polymer material, the high-density predominantly polymer material of the core layers 72 and 74 may contain various powdered, liquid, and fiber fillers, fiber reinforcements, fire-retardants, fungi growth-inhibiting agents, etc. to reduce the cost and/or modify the properties of the high-density core layers 72 and 74 (such as but not limited to the compressive strength, the flexibility, the friability, the fire resistance of the core layer). When the low-density core layer 76 is made of a predominantly polymer material foam, the low-density predominantly polymer material foam core layer 76 may contain various powdered, liquid and fiber fillers, fiber reinforcements, fire-retardants, fungi growth-inhibiting agents, etc. to reduce the cost and/or modify the properties of the low-density foam core layer. Examples of fillers that may be used in the high-density core layers 72 of the cover board 62 and the baseboard 66 and the low-density core layer 76 of the insulation board 64 are fillers such as but not limited to limestone (CaCO$_3$), fiberglass, recycled polyisocyanurate dust, extenders/plasticizers, ground up foam insulation, ground up rubber, wood dust, etc.

While, as shown in FIG. 5, the prefabricated roofing panel composite 60 has no facers, the prefabricated roofing panel composite 60 could have a common facer intermediate and bonded to both the bottom major surface of the cover board core layer 72 and the top major surface of the insulation board core layer 76, a common facer intermediate and bonded to both the bottom major surface of the insulation board core layer 76 and the top major surface of the baseboard core layer 74, a top facer bonded to the top major surface of the cover board core layer 72, and/or a bottom facer bonded to the bottom major surface of the baseboard core layer 74. When used, the common facers of the prefabricated roofing panel composite 60 may be any sheet material with good bonding surfaces that facilitates a good bond between the cover board 62, the insulation board 64, and the baseboard 66, such as but not limited to woven or nonwoven mats made of glass fibers, other fibers or filaments, scrims, etc. When used, the top facer of the prefabricated roofing panel composite 60 overlies the entire or substantially the entire top major surface of the high-density core layer 72 of the cover board 62. The top facer of the prefabricated roofing panel composite 60 may be any sheet material that provides a suitable top major surface for the prefabricated roofing panel composite 60, such as but not limited to coated or uncoated paper, foil, coated or uncoated woven or nonwoven mats made of fiberglass or other fibers or filaments, scrims, etc. When used, the bottom facer of the prefabricated roofing panel composite 60 overlies the entire or substantially the entire bottom surface of the high-density core layer 74 of the baseboard 66. The bottom facer of the prefabricated roofing panel composite 60 may be any sheet material that provides a suitable bottom major surface for the roofing panel composite 60, such as but not limited to coated or uncoated paper, foil, coated or uncoated woven or nonwoven mats made of fiberglass or other fibers or filaments, scrims, etc.

Figure 6:
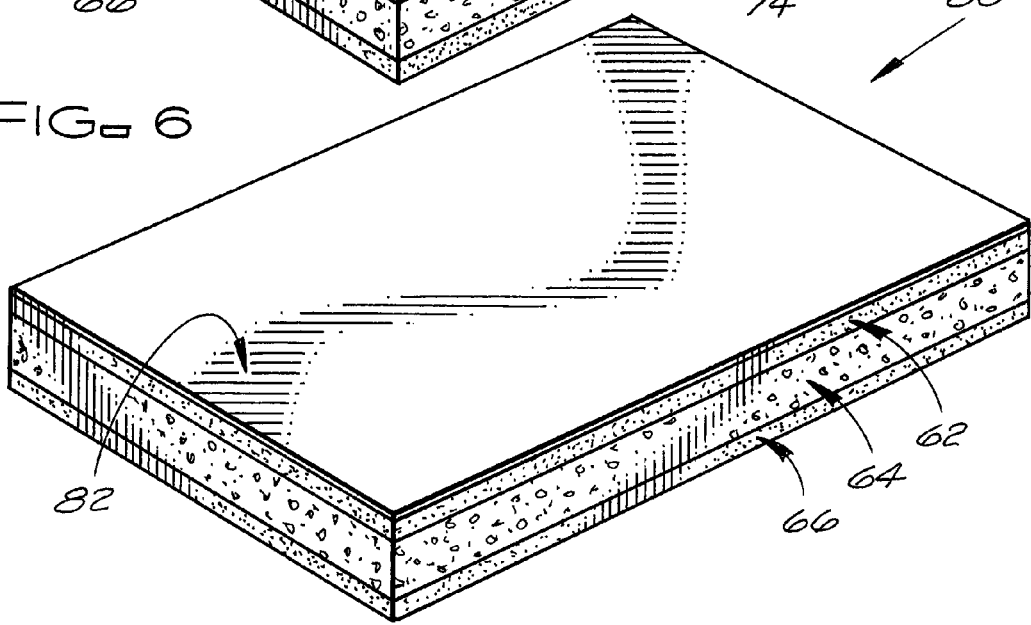
FIG. 6 is a schematic perspective view of a prefabricated roofing panel composite of the subject invention that includes a high-density polymer or predominantly polymer material cover board composite with a top facer, a low-density polymer or predominantly polymer material foam insulation board, a high-density polymer or predominantly polymer material baseboard.

FIG. 6 is a schematic perspective view of a prefabricated roofing panel composite 80 of the subject invention. The prefabricated roofing panel composite 80 includes the high-density polymer or predominantly polymer material cover board 62, the low-density polymer or predominantly polymer material foam insulation board 64, and the high-density polymer or predominantly polymer material baseboard 66, that, as shown in FIG. 6, are bonded directly together, and a top facer 82. Other than the inclusion of a top facer 82, the prefabricated roofing panel composite 80 of FIG. 6 is the same as the prefabricated roofing panel composite 60 of FIG. 5.

The top facer 82 of the prefabricated roofing panel composite 80 is bonded to and overlies the entire or substantially the entire top surface of the high-density polymer or predominantly polymer material core layer of the cover board 62. The top facer 82 of the prefabricated roofing panel composite 80 may be any sheet material that provides a suitable top major surface for the cover board and facer composite, such as but not limited to coated or uncoated paper, foil, coated or uncoated woven or nonwoven mats made of fiberglass or other fibers or filaments, scrims, etc. A preferred sheet material for the top facer 82 is a nonwoven fiberglass mat that is heavily coated with a mineral coating such as but not limited to a calcium carbonate/clay/SBR latex coating. Where the prefabricated roofing panel composite 80 is fully adhered to an underlying roofing layer (e.g. an insulation layer) rather than being secured by mechanical fasteners, a sheet material may be used for the top facer 82 that serves the dual function of providing a facing during the manufacturing process and a waterproofing membrane on the finished product such as but not limited to a bituminous or modified bituminous membrane, or a single ply membrane (e.g. a EPDM, PVC, or TPO membrane). Where the top facer 82 is a waterproofing membrane, the facer may extend beyond the high-density polymer or predominantly polymer material core layer of the cover board 62 on one or more of the four sides of the core layer, e.g. beyond a side edge and an end edge of the top major surface of the core layer to provide membrane overlaps for sealing with the membranes of adjacent panels.

While, as shown in FIG. 6, the prefabricated roofing panel composite 80 only has a top facer 82, the prefabricated roofing panel composite 80 could have a common facer intermediate and bonded to both the bottom major surface of the cover board core layer and the top major surface of the insulation board core layer, a common facer intermediate and bonded to both the bottom major surface of the insulation board core layer and the top major surface of the baseboard core layer, and/or a bottom facer bonded to the bottom major surface of the baseboard core layer. When used, the common facers of the prefabricated roofing panel composite 80 may be any sheet material with good bonding surfaces that facilitates a good bond between the cover board and insulation board and the insulation board and the baseboard, such as but not limited to woven or nonwoven mats made of glass fibers, other fibers or filaments, scrims, etc. When used, the bottom facer of the prefabricated roofing panel composite 80 overlies the entire or substantially the entire bottom surface of the high-density core layer of the baseboard 66. The bottom facer of the prefabricated roofing panel composite 80 may be any sheet material that provides a suitable bottom major surface for the prefabricated roofing panel composite 80, such as but not limited to coated or uncoated paper, foil, coated or uncoated woven or nonwoven mats made of fiberglass or other fibers or filaments, scrims, etc.

FIG. 7 is a schematic side view of a first production line 100 that can be used with the method of the subject invention to continuously make prefabricated roofing panel composites of the subject invention in line, such as the prefabricated roofing panel composites 30 of FIG. 3 and 50 of FIG. 4. The prefabricated roofing panel composites 30 and 50 each include a high-density polymer or predominantly polymer material cover board 32 and a low-density polymer or predominantly polymer material foam insulation board 34. The production line 100 includes: a first forming station 102 for forming the low-density polymer or predominantly polymer material foam insulation board 34 of the prefabricated roofing panel composites 30 and 50; a second forming station 104 for forming the high-density polymer or predominantly polymer material cover board 32 of the prefabricated roofing panel composites 30 and 50; and a cutting station 106 for cutting the prefabricated roofing panel composites 30 and 50 to length.

The first forming station 102 for forming the low-density foam insulation board 34 includes a conventional dispenser 108 for dispensing a low-density polymer or predominantly polymer material foam precursor 110 (e.g. a low-density polyisocyanurate or predominantly polyisocyanurate foam precursor) onto a facer, when used, overlying a conveyor 112 of two spaced-apart opposed forming conveyers 112 and 114 or directly onto the conveyor 112. As the foam precursor 110 passes between the forming conveyors 112 and 114, foams and at least partially sets, the forming conveyors 112 and 114 cooperate to set the thickness of the low-density polymer or predominantly polymer material foam core layer 42 of the low-density polymer or predominantly polymer foam insulation board 34 formed from the precursor 110. The first forming station 102 also includes supplies (e.g. rolls) of facer materials 116 and 118 that can be fed over and/or beneath the low-density polymer or predominantly polymer material foam precursor 110 to form a common facer of the prefabricated roofing panel composites 30 and 50 and a bottom facer of the prefabricated roofing panel composites 30 and 50.

The second forming station 104 of the production line 100 for forming the high-density polymer or predominantly polymer material cover board 32 of the prefabricated roofing panel composites 30 and 50 includes a conventional dispenser 120 for dispensing a high-density polymer or predominantly polymer material or foam precursor 122 (e.g. a high-density polyisocyanurate or predominantly polyisocyanurate foam precursor) onto the low-density polymer or predominantly polymer material foam core layer 42 or, when used, a common facer overlying the low-density polymer or predominantly polymer material foam core layer 42. With the high-density polymer or predominantly polymer material precursor 122 overlying the low-density foam core layer 42 or, when used, the common facer, the high-density polymer or predominantly polymer material precursor 122 and the low-density foam core layer 42 pass between two spaced-apart opposed forming conveyers 112 and 124 where the high-density polymer or predominantly polymer material core layer 38 is formed and bonded directly to the low-density foam core layer 42 or to the common facer overlying the low-density foam core layer 42. The spaced-apart opposed forming conveyors 112 and 124 cooperate to set the thickness of both the high-density polymer or predominantly polymer material core layer 40 and the prefabricated roofing panel composite 30 or 50. The second forming station 104 also includes supplies (e.g. rolls) of a facer material 126 that is fed over the high-density polymer or predominantly polymer material precursor 122 to form the top facer 52 of both the high-density cover board 32 and the prefabricated roofing panel composite 50.

With the high-density core layer 40 and the low-density foam core layer 42 of the prefabricated roofing panel composite 30 or 50 bonded together in the second forming station 104 to form a continuous length of the prefabricated roofing panel composite 30 or 50, the prefabricated roofing panel composite 30 or 50 is then cut to length to complete the formation of the prefabricated roofing panel composite 30 or 50. In the cutting station 106 a cutter, such as but not limited to a reciprocating cutter 128, cuts the prefabricated roofing panel composite 30 or 50 coming from the second forming station 104 to length.

While the production line 100, as shown, is capable of applying three facer materials 116, 118, and 126 to the insulation board 34 and the cover board 32 to form the prefabricated roofing panel composites 30 and 50. The application of any one, any two, or all of the facing materials 116, 118 and 126 to the insulation board and cover board can be omitted to form the prefabricated roofing panel composite 30 and all but the top facing material can be omitted to form the prefabricated roofing panel composite 50 with the desired number of facers. The facers 116, 118 and 126 normally prevent the polymer or predominantly polymer layers from sticking to the conveyors. However, with a shift in the chemistry of the precursors 110 and 122 to affect the tackiness of the layers produced so that they do not stick to the surfaces of the conveyors or by applying release films or coatings to the surfaces of the conveyers that will not allow the layers produced to stick to the surfaces of the conveyors, when desired, any one or all of the facing materials are not needed for and could be eliminated from the manufacturing process.

FIG. 8 is a schematic side view of a second production line 200 that can be used with the method of the subject invention to continuously make prefabricated roofing panel composites of the subject invention, such as the prefabricated roofing panel composites 30 of FIG. 3 and 50 of FIG. 4. The prefabricated roofing panel composites 30 and 50 each include a high-density polymer or predominantly polymer material cover board and a low-density polymer or predominantly polymer material foam insulation board. The production line 200 includes: an in-feed conveyor 202 for continuously feeding a series of low-density polymer or predominantly polymer material foam insulation boards 34 of the prefabricated roofing panel composite into a forming station 204; the forming station 204 for forming the high-density polymer or predominantly polymer material cover board 32 of the prefabricated roofing panel composites 30 and 50; and a cutting station 206 for cutting the prefabricated roofing panel composites 30 and 50 to length.

The low-density polymer or predominantly polymer material foam insulation boards 34 may include a top facer that, when used, forms a common facer of the prefabricated roofing panel composites 30 and 50 and may include a bottom facer that, when used, forms a bottom facer of the prefabricated roofing panel composites. Preferably, the low-density polymer or predominantly polymer material foam insulation boards 34 are fed into the forming station 204 lengthwise with the ends of successive insulation boards 34 in the continuous series of insulation boards abutting each other.

The forming station 204 of the production line 200 for forming the high-density polymer or predominantly polymer material cover board 32 of the prefabricated roofing panel composite 30 includes a conventional dispenser 208 for dispensing the high-density polymer or predominantly polymer material precursor 210 (e.g. a high-density polyisocyanurate or predominantly polyisocyanurate precursor) directly onto the low-density foam core layers 42 of the insulation boards 34 or, when used the common facers overlying the low-density foam core layers of the low-density foam insulation boards. With the high-density polymer or predominantly polymer material precursor 210 directly overlying the low-density foam core layers 42 of the insulation boards or the common facers 36 carried by the low-density foam insulation boards 34, the high-density polymer or predominantly polymer material precursor 210 and the low-density foam insulation boards 34 pass between two spaced-apart opposed forming conveyers 212 and 214 where the high-density polymer or predominantly polymer material core layers 38 of the cover boards 32 are formed and bonded directly to the low-density foam core layers 42 of the insulation boards 34 or to the common facers overlying the low-density foam insulation board 34. The spaced-apart opposed forming conveyors 212 and 214 cooperate to set the thickness of both the high-density polymer or predominantly polymer material core layer 40 and the prefabricated roofing panel composite 30 or 50. The forming station 204 also includes supplies (e.g. rolls) of a facer material 216 that is fed over the high-density polymer or predominantly polymer material precursor 210 to form the top facer 52 of both the high-density polymer or predominantly polymer material cover board 32 and the prefabricated roofing panel composite 50.

With the high-density core layer 40 and the low-density foam core layer 42 of the prefabricated roofing panel composite 30 or 50 bonded together in the forming station 204 to form a continuous length of the prefabricated roofing panel composite 30 or 50, the prefabricated roofing panel composite 30 or 50 is then cut to length to complete the formation of the prefabricated roofing panel composite 30 or 50. In the cutting station 206 a cutter, such as but not limited to a reciprocating cutter 218, cuts the prefabricated roofing panel composite 30 coming from the forming station 204 to length.

The production line 200, as shown, is capable of making the prefabricated roofing panel composite 30 by feeding preformed low-density polymer or predominantly polymer material foam insulation boards 34 into the forming station 204 and omitting the application of the facer material 216 to the cover board 32 and is capable of making the prefabricated roofing panel composite 50 by feeding preformed low-density polymer or predominantly polymer material foam insulation boards 34 into the forming station 204 and applying of the facer material 216 to the cover board 32. The facer 216 normally prevents the high-density polymer or predominantly polymer material layer from sticking to the conveyor 212. However, with a shift in the chemistry of the precursor 210 to affect the tackiness of the layer produced so that the layer does not stick to the surface of the conveyor 212 or by applying a release film or coating to the surface of the conveyer 212 that will not allow the layer produced to stick to the surface of the conveyor, when desired, the facing materials 216 is not needed for and could be eliminated from the manufacturing process.

FIG. 9 is a schematic side view of a production line 300 that can be used with the method of the subject invention to continuously make a prefabricated roofing panel composite of the subject invention, such as the prefabricated roofing panel composites 60 of FIG. 5 and 80 of FIG. 6. These prefabricated roofing panel composites each include: a high-density polymer or predominantly polymer material cover board 62, a low-density polymer or predominantly polymer material foam insulation board 64, and a high-density polymer or predominantly polymer material baseboard 66. The production line 300 includes: a first forming station 302 for forming the high-density polymer or predominantly polymer material baseboard 66 of the prefabricated roofing panel composites 60 and 80; a second forming station 304 for forming the low-density polymer or predominantly polymer material foam insulation board 64 of the prefabricated roofing panel composites 60 and 80; a third forming station 306 for forming the high-density polymer or predominantly polymer material cover board 62 of the prefabricated roofing panel composites 60 and 80; and a cutting station 308 for cutting the prefabricated roofing panel composites 60 and 80 to length.

The first forming station 302 for forming the high-density polymer or predominantly polymer material baseboard 56 includes a conventional dispenser 310 for dispensing a high-density polymer or predominantly polymer material precursor 312 (e.g. a high-density polyisocyanurate or predominantly polyisocyanurate precursor) onto a facer, when used, overlying a conveyor 314 of two spaced-apart opposed forming conveyors 314 and 316 or directly onto the conveyor 314. As the precursor 310 passes between the forming conveyors 314 and 316, forms and at least partially sets, the forming conveyors 314 and 316 cooperate to set the thickness of the high-density polymer or predominantly polymer material core layer 74 of the high-density baseboard 66 formed from the precursor 310. The first forming station 302 also includes supplies (e.g. rolls) of facer materials 318 and 320 that may be fed over and/or beneath the high-density polymer or predominantly polymer material precursor 310 to form, when used, a common facer of the prefabricated roofing panel composites 60 and 80 and a bottom facer of the prefabricated roofing panel composites 60 and 80.

The second forming station 304 of the production line 300 for forming the low-density polymer or predominantly polymer material foam insulation board 64 of the prefabricated roofing panel composites 60 and 80 includes a conventional dispenser 322 for dispensing a low-density polymer or predominantly polymer material foam precursor 324 (e.g. a low-density polyisocyanurate or predominantly polyisocyanurate foam precursor) directly onto the high-density core layer 74 or, when used, onto a common facer overlying the high-density core layer 74 of the baseboard 66. With the low-density polymer or predominantly polymer material foam precursor 324 directly overlying high-density core layer 74 or the common facer overlying the high-density core layer 74 of the baseboard 66, the low-density polymer or predominantly polymer material foam precursor 324 and the high-density core layer 74 pass between two spaced-apart opposed forming conveyors 314 and 326 where the low-density polymer or predominantly polymer material foam core layer 76 of the insulation board 64 is formed and bonded to the high-density core layer 74 or the common facer overlying the high-density core layer 74 of the baseboard 66. The spaced-apart opposed forming conveyors 314 and 326 cooperate to set the thickness of the low-density polymer or predominantly polymer material foam core layer 76 of the insulation board 64. The second forming station 304 also includes supplies (e.g. rolls) of a facer material 328 that can be fed over the low-density polymer or predominantly polymer material foam precursor 324 to form a common facer of the prefabricated roofing panel composites 60 and 80.

The third forming station 306 of the production line 300 for forming the high-density polymer or predominantly polymer material cover board 62 of the prefabricated roofing panel composites 60 and 80 includes a conventional dispenser 330 for dispensing a high-density polymer or predominantly polymer material precursor 332 (e.g. a high-density polyisocyanurate or predominantly polyisocyanurate precursor) directly onto the low-density foam core layer 76 or the common facer overlying the low-density foam core layer 76 of the insulation board 64. With the high-density polymer or predominantly polymer material precursor 332 overlying the low-density foam core layer 76 or the common facer overlying the low-density foam core layer 76, the high-density polymer or predominantly polymer material precursor 332, the low-density foam insulation board 64, and the high-density baseboard 66 pass between two spaced-apart opposed forming conveyers 314 and 334 where the high-density polymer or predominantly polymer material core layer 72 of the cover board 62 is formed and bonded to the low-density foam core layer 76 or the common facer overlying the low-density foam core layer 76 of the insulation board 64. The spaced-apart opposed forming conveyors 314 and 334 cooperate to set the thickness of both the high-density polymer or predominantly polymer material core layer 72 and the prefabricated roofing panel composite 60 or 80. The third forming station 306 also includes supplies (e.g. rolls) of a facer material 336 that is fed over the high-density polymer or predominantly polymer material precursor 332 to form the top facer 82 of both the high-density cover board 62 and the prefabricated roofing panel composite 80.

With the high-density polymer or predominantly polymer material cover board 62, the low-density polymer or predominantly polymer material foam insulation board 64, and the high-density polymer or predominantly polymer material baseboard 66 of the prefabricated roofing panel composites 60 or 80 bonded together in the third forming station 306 to form a continuous length of the prefabricated roofing panel composite 60 or 80, the prefabricated roofing panel composite 60 or 80 is then cut to length to complete the formation of the prefabricated roofing panel composite 60 or 80. In the cutting station 308 a cutter, such as but not limited to a reciprocating cutter 338, cuts the continuous prefabricated roofing panel composite 60 or 80 coming from the third forming station 306 to length.

While the production line 300, as shown, is capable of applying four facer materials 318, 320, 328, and 336 to the baseboard 66, the insulation board 64 and the cover board 62 to form the prefabricated roofing panel composites 60 and 80. The application of any one, any two, any three or all of the facing materials 318, 320, 328, and 336 to the baseboard, the insulation board and the cover board can be omitted to form the prefabricated roofing panel composite 60 and all but the top facing material can be omitted to form the prefabricated roofing panel composite 80 with the desired number of facers. The facers 318, 320, 328, and 336 normally prevent the composite layers from sticking to the conveyors. However, with a shift in the chemistry of the precursors 312, 324, and 332 to affect the tackiness of the layers produced so that they do not stick to the surfaces of the conveyors or by applying release films or coatings to the surfaces of the conveyers that will not allow the layers produced to stick to the surfaces of the conveyors, when desired, any one or all of the facing materials are not needed for and could be eliminated from the manufacturing process.

FIG. 10 is a schematic side view of another production line 400 that can be used with the method of the subject invention to continuously make prefabricated roofing panel composites of the subject invention in line, such as the prefabricated roofing panel composites 30 of FIG. 3 and 50 of FIG. 4. The prefabricated roofing panel composites 30 and 50 each include a high-density polymer or predominantly polymer material cover board 32 and a low-density polymer or predominantly polymer material foam insulation board 34. The production line 400 includes: a forming station 402 for forming the low-density polymer or predominantly polymer material foam insulation board 34 and the high-density polymer or predominantly polymer material cover board 32 of the prefabricated roofing panel composites 30 and 50; and a cutting station 404 for cutting the prefabricated roofing panel composites 30 and 50 to length.

The forming station 402 for forming the low-density foam insulation board 34 and the high-density cover board includes a conventional dispenser 406 for dispensing a low-density polymer or predominantly polymer material foam precursor 408 (e.g. a low-density polyisocyanurate or predominantly polyisocyanurate foam precursor) onto a facer, when used, overlying a conveyor 410 of two spaced-apart opposed forming conveyers 410 and 412 or directly onto the conveyor 410. The forming station 402 also includes a conventional dispenser 414 for dispensing a high-density polymer or predominantly polymer material precursor 416 (e.g. a high-density polyisocyanurate or predominantly polyisocyanurate material precursor) onto the low-density polymer or predominantly polymer material foam precursor of the core layer 42 or, when used, a common facer overlying the low-density polymer or predominantly polymer material foam precursor of the core layer 42. As the layers of precursor 408 and 416 pass between the forming conveyors 410 and 412, the precursors form and at least partially set, the forming conveyors 410 and 412 cooperate to set the thickness of the low-density polymer or predominantly polymer material foam core layer 42 of insulation board 34 formed from the precursor 408, the thickness of the high-density polymer or predominantly polymer material core layer 40 of cover board 32 formed from the precursor 416, and the thickness of the prefabricated roofing panel composite 30 or 50. The forming station 402 also includes supplies (e.g. rolls) of facer materials 418, 420, and 422 that can be fed over and/or beneath the low-density polymer or predominantly polymer material foam precursor 408 to form a common facer of the prefabricated roofing panel composites 30 and 50 and a bottom facer of the prefabricated roofing panel composites 30 and 50 and that can be fed over the high-density polymer or predominantly polymer material precursor 416 to form a top facer of the prefabricated roofing panel composites 30 and 50.

With the high-density core layer 40 and the low-density foam core layer 42 of the prefabricated roofing panel composite 30 or 50 bonded together to form a continuous length of the prefabricated roofing panel composite 30 or 50, the prefabricated roofing panel composite 30 or 50 is then cut to length to complete the formation of the prefabricated roofing panel composite 30 or 50. In the cutting station 404 a cutter, such as but not limited to a reciprocating cutter 424, cuts the prefabricated roofing panel composite 30 or 50 coming from the forming station 402 to length.

While the production line 400, as shown, is capable of applying three facer materials 418, 420 and 422 to the insulation board 34 and the cover board 32 to form the prefabricated roofing panel composites 30 and 50. The application of any one, any two, or all of the facing materials 418, 420, and 422 to the insulation board and cover board can be omitted to form the prefabricated roofing panel composite 30 and all but the top facing material can be omitted to form the prefabricated roofing panel composite 50 with the desired number of facers. The facers 418, 420, and 422 normally prevent the layers of the composite from sticking to the conveyors. However, with a shift in the chemistry of the precursors 408 and 416 to affect the tackiness of the layers produced so that they do not stick to the surfaces of the conveyors or by applying release films or coatings to the surfaces of the conveyers that will not allow the layers produced to stick to the surfaces of the conveyors, when desired, any one or all of the facing materials are not needed for and could be eliminated from the manufacturing process.

Preferably, the low-density polymer or predominantly polymer material foam precursors 110, 324, and 408 are low-density polyisocyanurate or predominantly polymer foam precursors. Preferably, the high-density polymer or predominantly polymer material precursors 122, 210, 312, 332, and 416 are high-density polyisocyanurate or predominantly polyisocyanurate material precursors. The high-density polymer or predominantly polymer material precursors 122, 210, 312, 332, and 416 can be formulated to produce high-density materials or foams by significantly reducing or eliminating the blowing agent(s) from the precursors 122, 210, 312, 332, and 416. Pentane (HFC), micro-spheres, $CO_2$ and water (as well as other materials) will act as blowing agents for the precursors. The relatively high-density layers produced using these types of precursors have improved strength characteristics over the low-density foams normally produced for insulation products. As the amount of blowing agent is reduced in the precursors 122, 210, 312, 332, and 416, the density and the compressive strength of the high-density layers produced increase. These types of high-density core layers are much more resistant to deformation than the typical low-density foam core layers.

Figure 11:
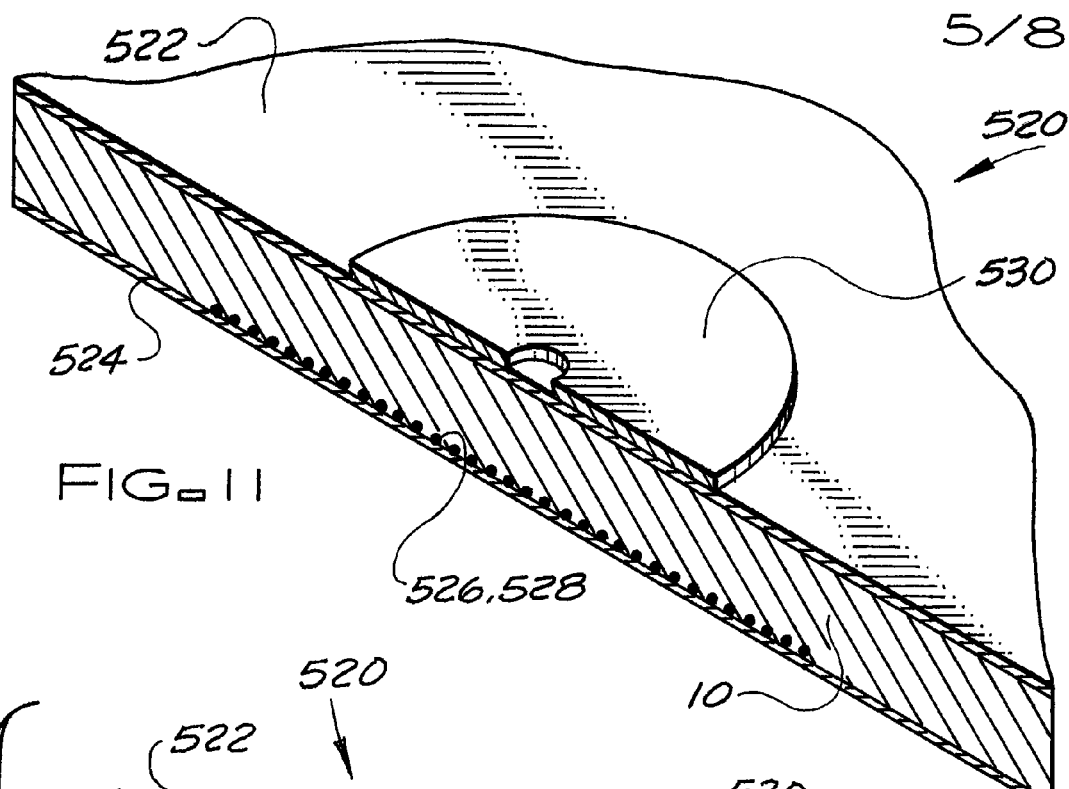
FIG. 11 is a fragmentary, transverse schematic, perspective view of a cover board composite of the subject invention, at a fastener location, wherein the composite includes a reinforcement for increasing the fastener wind-uplift pull through rating of the cover board composite. The Figure also shows a portion of a fastener plate that can be used with the composite.
Figure 12:
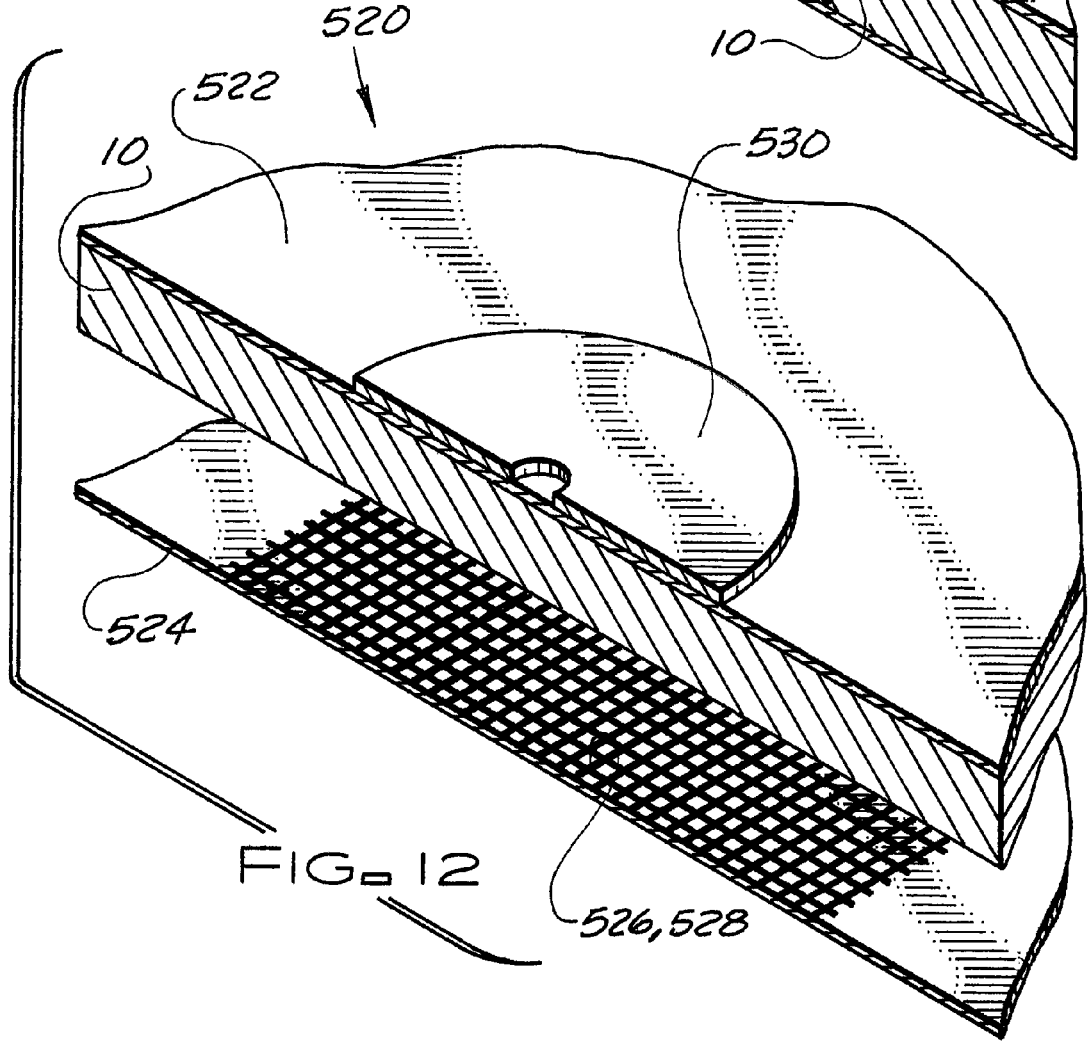
FIG. 12 is a fragmentary, partially exploded, transverse schematic, perspective view of the cover board composite of FIG. 11 at a fastener location.

FIGS. 11 and 12 are fragmentary, transverse schematic, perspective views of a prefabricated cover board composite 520 of the subject invention. The composite 520 includes the cover board 10 of FIG. 1, a top facer 522 (e.g. a waterproofing membrane), a bottom facer 524, and a plurality of wind-uplift reinforcement patches 526 (such as but not limited to the wind-uplift reinforcement patches shown in FIGS. 15 and 16) or strips 528 (such as but not limited to the wind-uplift reinforcement strips shown in FIG. 17). Conventional fastener plates, such as but not limited to the disc shaped metallic fastener plate 530, are typically used at each fastener penetration of the prefabricated cover board composite 520 to spread the forces exerted on the top major surface of the composite by the nails or other mechanical fasteners securing the composite to a roof deck over a greater surface area and thereby reduce the pressures exerted by the fasteners (not shown) on the top major surface of the composite. Other than the inclusion of a top facer 522, a bottom facer 524, and a plurality of wind-uplift reinforcements, such as the wind-uplift reinforcement patches 526 or strips 528 the prefabricated cover board composite 520 is the same as the cover board 10 of FIG. 1.

The top facer 522 that is bonded to the top major surface of the high-density polymer or predominantly polymer material core layer of the cover board composite 520 may be any sheet material that provides a suitable top major surface for the cover board composite, such as but not limited to coated or uncoated paper, foil, coated or uncoated woven or nonwoven mats made of fiberglass or other fibers or filaments, scrims, etc. A preferred sheet material for the top facer 522 is a nonwoven fiberglass mat that is heavily coated with a mineral coating such as but not limited to a calcium carbonate/clay/SBR latex coating. Where the cover board composite 520 is fully adhered to an underlying roofing layer (e.g. an insulation layer) rather than being secured by mechanical fasteners, a sheet material may be used for the top facer 522 that serves the dual function of providing a facing during the manufacturing process and a waterproofing membrane on the finished product such as but not limited to a bituminous or modified bituminous membrane, or a single ply membrane (e.g. a EPDM, PVC, or TPO membrane). Where the top facer 522 is a waterproofing membrane, the facer may extend beyond the high-density polymer or predominantly polymer material core layer of the cover board 10 on one or more of the four sides of the core layer (e.g. beyond a side edge and an end edge of the top major surface of the core layer) to form membrane overlaps for sealing to the membranes of other composites 520. The bottom facer 524 is bonded to and typically coextensive with the bottom major surface of the high-density polymer or predominantly polymer material core layer of the cover board composite 520. The bottom facer 524 of the composite 520 may be any sheet material that provides a suitable bottom major surface for the cover board composite 520, such as but not limited to coated or uncoated paper, coated or uncoated woven or nonwoven mats made of fiberglass or other fibers or filaments, scrims, etc. However, a preferred bottom facer 524, is a coated or uncoated woven or nonwoven fiberglass mat such as but not limited to the preferred top facer 522.

Figure 15:
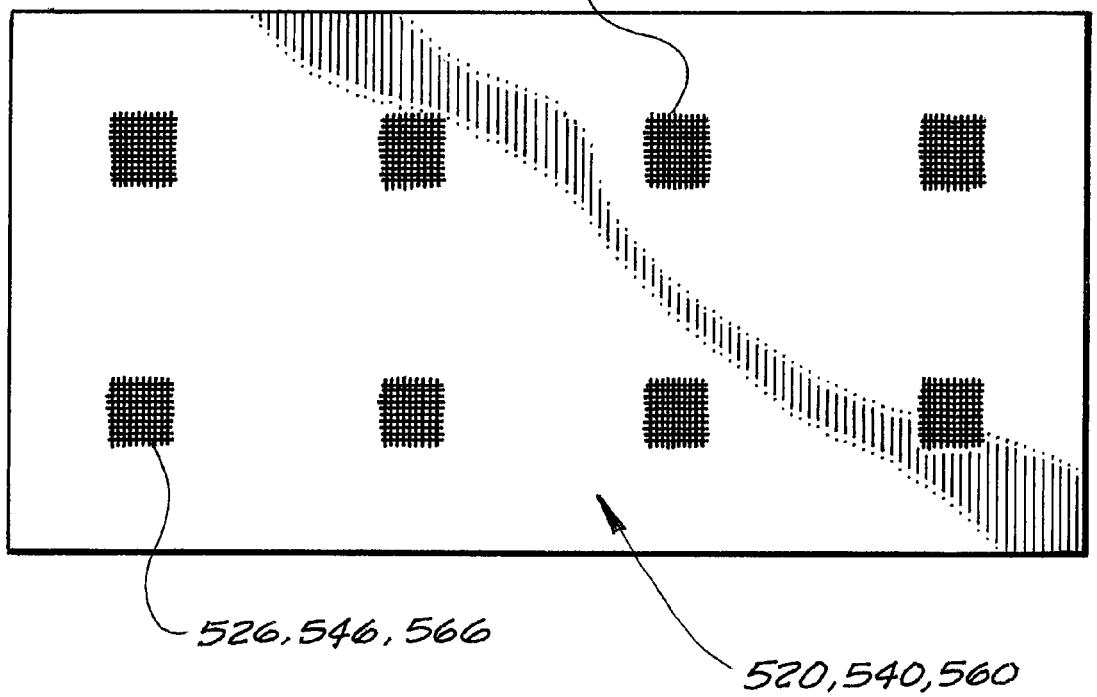
FIG. 15 is a schematic bottom view of the prefabricated cover board, cover board/insulation board panel, or cover board/insulation board/baseboard panel composites of FIGS. 11 to 14, with the bottom facer removed, to show a reinforcement patch pattern for increasing the fastener wind-uplift pull through rating of the composites.
Figure 16:
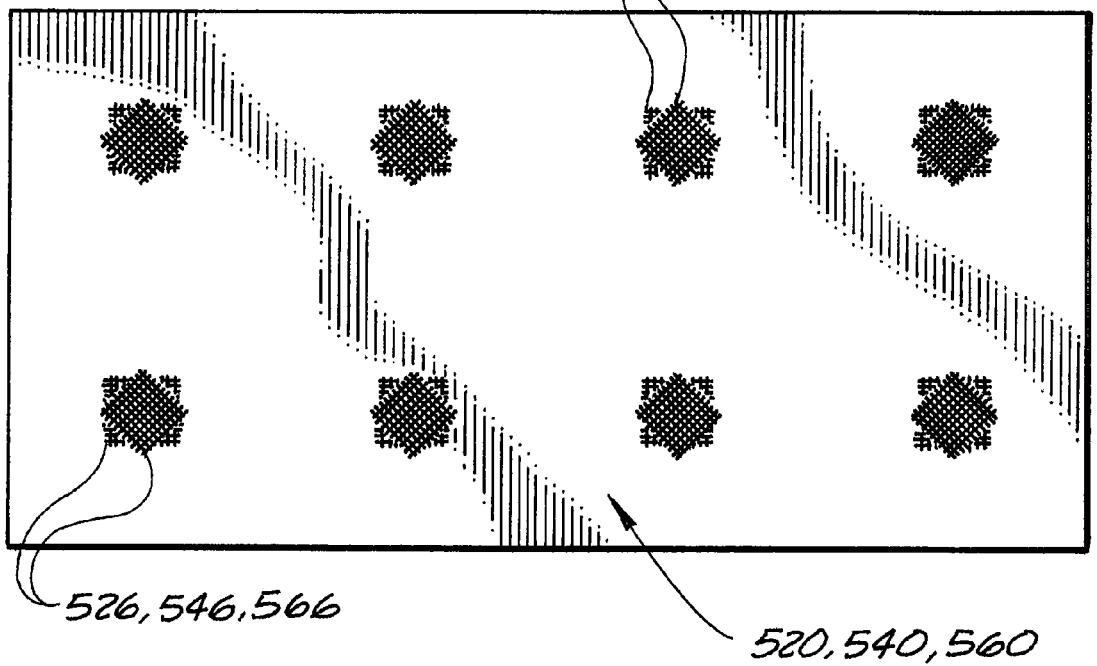
FIG. 16 is a schematic bottom view of the prefabricated cover board, cover board/insulation board panel, or cover board/insulation board/baseboard panel composites of FIGS. 11 to 14, with the bottom facer removed, to show a double-layer reinforcement patch pattern for increasing the fastener wind-uplift pull through rating of the composites.

The wind-uplift reinforcements, e.g. the wind-uplift reinforcement patches 526 (such as but not limited to the wind-uplift reinforcement patches shown in FIGS. 15 and 16) or the wind-uplift reinforcement strips 528 (such as but not limited to the wind-uplift reinforcement strips shown in FIG. 17), may be made of various reinforcement sheet or mat materials, such as but not limited to sheets or mats of glass, polyester, polypropylene, metal, wool, and other synthetic and natural fibers and combinations of such fibers. However, a preferred reinforcement material for the wind-uplift reinforcements, e.g. the wind-uplift reinforcement patches and strips is a scrim such as fiberglass scrim with a minimum tensile strength of 30 lbs per linear inch and preferably, a minimum tensile strength of at least 100 lbs per linear inch, e.g. a fiberglass scrim that is 10 grams/ft$^2$ with 8×8 strands per inch wherein the mean diameter of the strands is 0.019 inches.

When a cover board composite is subjected to wind-uplift forces from high winds during service, the wind-uplift forces exerted on a cover board composite, if not controlled, will tend to place the top portion of the composite in compression and the bottom portion of the composite in tension at the fastener locations to thereby place the composite under stress at these locations. Repeated cycles of stress exerted on a cover board composite at the fastener locations during service can result in a failure of the composite at one or more of the fastener locations. The wind-uplift reinforcements of the subject invention, e.g. the wind-uplift reinforcement patches 526 or reinforcement strips 528, greatly increase the pressures that the cover board composite can withstand before failure at a fastener location. While the cover board composite still flexes, the wind-uplift reinforcements of the subject invention extend or increase the load the bottom facer can withstand before the bottom facer 524 fails at a fastener location. The wind-uplift reinforcements, e.g. the wind-uplift reinforcement patches 526 (such as but not limited to the wind-uplift reinforcement patches shown in FIGS. 15 and 16) or the wind-uplift reinforcement strips 528 (such as but not limited to the wind-uplift reinforcement strips shown in FIG. 17) are interposed between the bottom facer 524 and the bottom major surface of the core layer to coincide with a selected fastener pattern or selected fastener patterns for securing the cover board composite 520 to a roof deck and increase a per-fastener wind-uplift pull through rating for the cover board composite.

Figure 13:
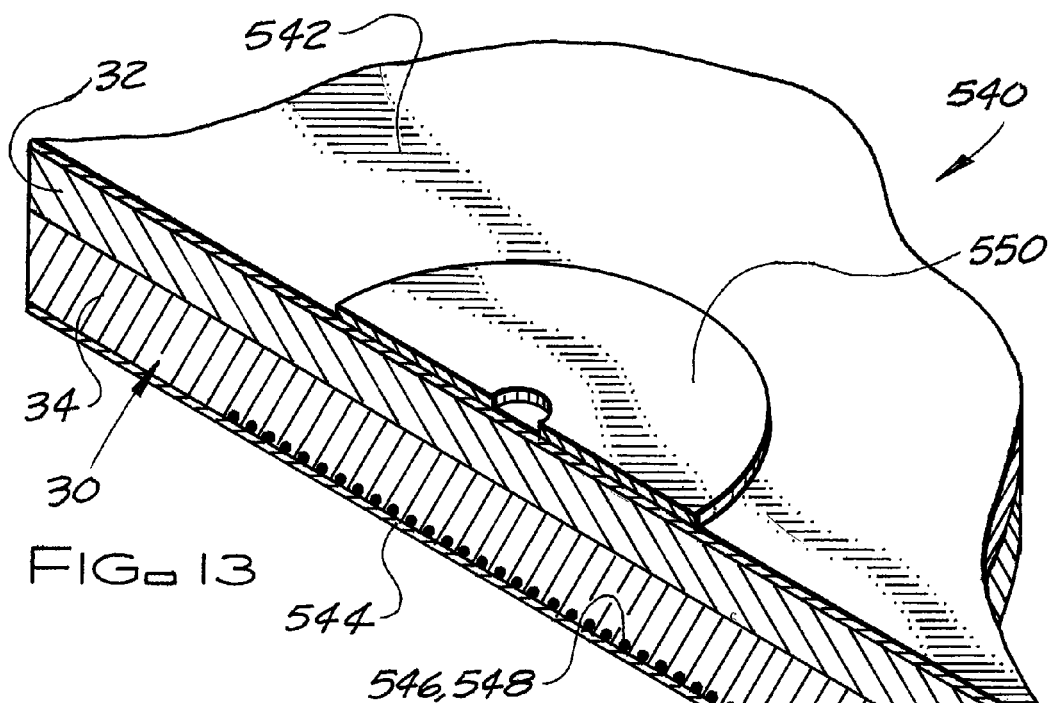
FIG. 13 is a fragmentary, transverse schematic, perspective view of a prefabricated cover board/insulation board panel composite of the subject invention, at a fastener location, wherein the panel composite includes a reinforcement for increasing the fastener wind-uplift pull through rating of the panel composite. The Figure also shows a portion of a fastener plate that can be used with the panel composite.

FIG. 13 is a fragmentary, transverse schematic, perspective view of a prefabricated cover board/insulation board panel composite 540 of the subject invention. The panel composite 540 includes the cover board/insulation board panel composite 30 of FIG. 3, which includes a cover board 32 with a high-density polymer or predominantly polymer material core layer and an insulation board 34 with a low-density polymer or predominantly polymer material core layer; a top facer 542 (e.g. a waterproofing membrane); a bottom facer 544; and a plurality of wind-uplift reinforcement patches 546 (such as but not limited to the wind-uplift reinforcement patches shown in FIGS. 15 and 16) or strips 548 (such as but not limited to the wind-uplift reinforcement strips shown in FIG. 17). Fastener plates, such as but not limited to the fastener plate 550, are typically used at each fastener penetration of the prefabricated cover board/insulation board panel composite 540 to spread the forces exerted on the top major surface of the panel composite by the fasteners securing the composite to a roof deck over a greater surface area and thereby reduce the pressures exerted by the fasteners (not shown) on the top major surface of the panel composite. Other than the inclusion of a top facer 542, a bottom facer 544, and a plurality of wind-uplift reinforcements, such as the wind-uplift reinforcement patches 546 or strips 548 the prefabricated cover board/insulation board panel composite 540 is the same as the cover board/insulation board panel composite 30 of FIG. 3.

The top facer 542 that is bonded to the top major surface of the high-density polymer or predominantly polymer material core layer of the cover board 32 may be any sheet material that provides a suitable top major surface for the cover board/insulation board panel composite 540, such as but not limited to coated or uncoated paper, foil, coated or uncoated woven or nonwoven mats made of fiberglass or other fibers or filaments, scrims, etc. A preferred sheet material for the top facer 542 is a nonwoven fiberglass mat that is heavily coated with a mineral coating such as but not limited to a calcium carbonate/clay/SBR latex coating. The bottom facer 544 is bonded to and typically coextensive with the bottom major surface of the low-density polymer or predominantly polymer material core layer of the insulation board 34. The bottom facer 544 of the composite 540 may be any sheet material that provides a suitable bottom major surface for the cover board/insulation board composite 540, such as but not limited to coated or uncoated paper, coated or uncoated woven or nonwoven mats made of fiberglass or other fibers or filaments, scrims, etc. However, a preferred bottom facer 544, is a coated or uncoated woven or nonwoven fiberglass mat such as but not limited to the preferred the top facer 542.

The wind-uplift reinforcements, e.g. the wind-uplift reinforcement patches 546 (such as but not limited to the wind-uplift reinforcement patches shown in FIGS. 15 and 16) or the wind-uplift reinforcement strips 548 (such as but not limited to the wind-uplift reinforcement strips shown in FIG. 17), may be made of various reinforcement sheet or mat materials, such as but not limited to sheets or mats of glass, polyester, polypropylene, metal, wool, and other synthetic and natural fibers and combinations of such fibers. However, a preferred reinforcement material for the wind-uplift reinforcements, e.g. the wind-uplift reinforcement patches and strips is a scrim such as fiberglass scrim with a minimum tensile strength of 30 lbs per linear inch and preferably, a minimum tensile strength of at least 100 lbs per linear inch, e.g. a fiberglass scrim that is 10 grams/ft$^2$ with 8×8 strands per inch wherein the mean diameter of the strands is 0.019 inches. The wind-uplift reinforcements, e.g. the wind-uplift reinforcement patches 546 (such as but not limited to the wind-uplift reinforcement patches shown in FIGS. 15 and 16) or the wind-uplift reinforcement strips 548 (such as but not limited to the wind-uplift reinforcement strips shown in FIG. 17) are interposed between the bottom facer 544 and the bottom major surface of the insulation board core layer to coincide with a selected fastener pattern or selected fastener patterns for securing the cover board, insulation board panel composite 540 to a roof deck and increase a per-fastener wind-uplift pull through rating for the cover board/insulation board panel composite. The wind-uplift reinforcements of the cover board/insulation board panel composite 540 perform the same or substantially the same function as the wind-uplift reinforcements of the cover board composite 520.

Figure 14:
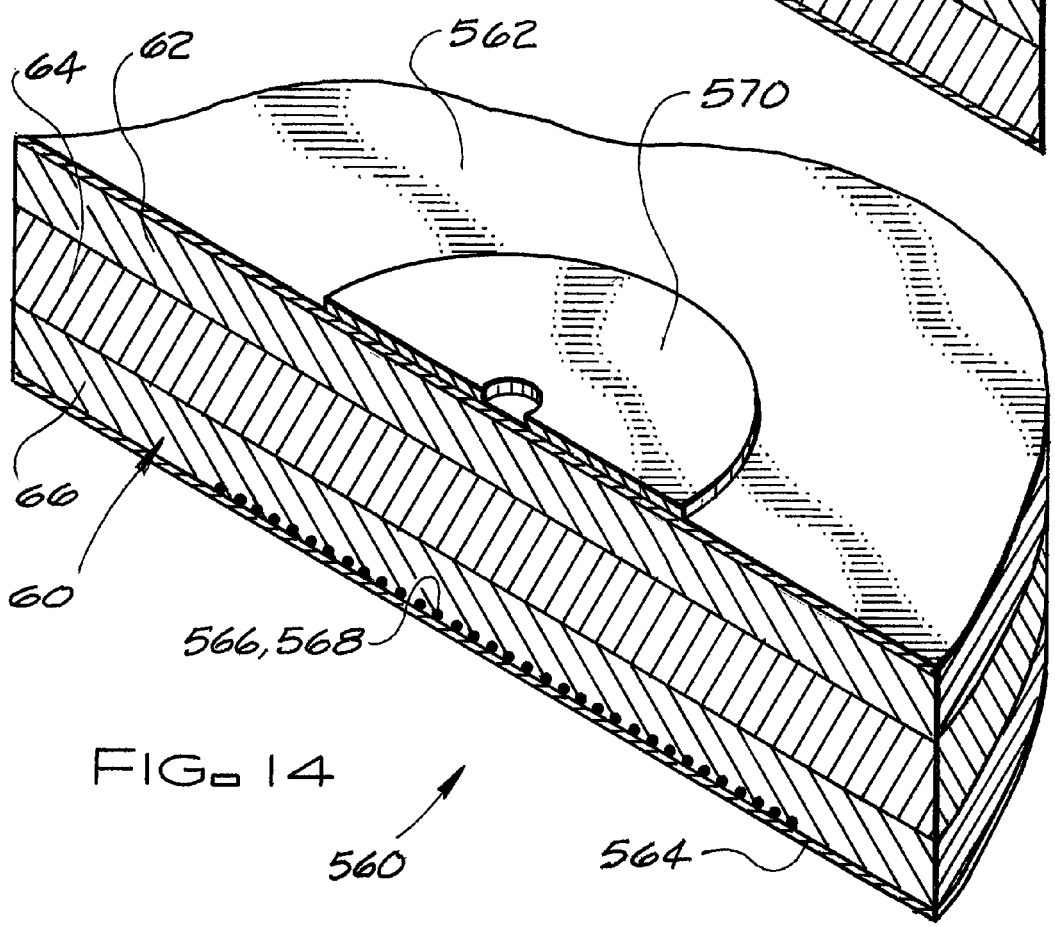
FIG. 14 is a fragmentary, schematic, perspective view of a prefabricated cover board/insulation board/baseboard panel composite of the subject invention, at a fastener location, wherein the panel composite includes a reinforcement for increasing the fastener wind-uplift pull through rating of the panel composite. The Figure also shows a portion of a fastener plate that can be used with the composite.

FIG. 14 is a fragmentary, transverse schematic, perspective view of a prefabricated cover board/insulation board/baseboard panel composite 560 of the subject invention. The panel composite 560 includes the roofing panel composite 60 of FIG. 5, which includes a cover board 62 with a high-density polymer or predominantly polymer material core layer, an insulation board 64 with a low-density polymer or predominantly polymer material foam core layer; a baseboard 66 with a high-density polymer or predominantly polymer material core layer; a top facer 562 (e.g. a waterproofing membrane), a bottom facer 564, and a plurality of wind-uplift reinforcement patches 566 (such as but not limited to the wind-uplift reinforcement patches shown in FIGS. 15 and 16) or strips 568 (such as but not limited to the wind-uplift reinforcement strips shown in FIG. 17). Fastener plates, such as but not limited to the fastener plate 570, are typically used at each fastener penetration of the prefabricated cover board/insulation board/baseboard panel composite 560 to spread the forces exerted on the top major surface of the composite by the fasteners securing the composite to a roof deck over a greater surface area and thereby reduce the pressures exerted by the fasteners (not shown) on the top major surface of the panel composite. Other than the inclusion of a top facer 562, a bottom facer 564, and a plurality of wind-uplift reinforcements, such as the wind-uplift reinforcement patches 566 or strips 568 the prefabricated cover board/insulation board/baseboard panel composite 560 is the same as the cover board/insulation board/baseboard panel composite 60 of FIG. 5.

The top facer 562 that is bonded to the top major surface of the high-density polymer or predominantly polymer material core layer of the cover board 62 may be any sheet material that provides a suitable top major surface for the cover board/insulation board/baseboard panel composite, such as but not limited to coated or uncoated paper, foil, coated or uncoated woven or nonwoven mats made of fiberglass or other fibers or filaments, scrims, etc. A preferred sheet material for the top facer 522 is a nonwoven fiberglass mat that is heavily coated with a mineral coating such as but not limited to a calcium carbonate/clay/SBR latex coating. The bottom facer 564 is bonded to and typically coextensive with the bottom major surface of the high-density polymer or predominantly polymer material core layer of the baseboard 66. The bottom facer 564 of the composite 560 may be any sheet material that provides a suitable bottom major surface for the cover board/insulation board/baseboard composite 560, such as but not limited to coated or uncoated paper, coated or uncoated woven or nonwoven mats made of fiberglass or other fibers or filaments, scrims, etc. However, a preferred bottom facer 564, is a coated or uncoated woven or nonwoven fiberglass mat such as but not limited to the preferred top facer 562.

The wind-uplift reinforcements, e.g. the wind-uplift reinforcement patches 566 (such as but not limited to the wind-uplift reinforcement patches shown in FIGS. 15 and 16) or the wind-uplift reinforcement strips 568 (such as but not limited to the wind-uplift reinforcement strips shown in FIG. 17), may be made of various reinforcement sheet or mat materials, such as but not limited to sheets or mats of glass, polyester, polypropylene, metal, wool, and other synthetic and natural fibers and combinations of such fibers. However, a preferred reinforcement material for the wind-uplift reinforcements, e.g. the wind-uplift reinforcement patches and strips is a scrim such as fiberglass scrim with a minimum tensile strength of 30 lbs per linear inch and preferably, a minimum tensile strength of at least 100 lbs per linear inch, e.g. a fiberglass scrim that is 10 grams/ft$^2$ with 8×8 strands per inch wherein the mean diameter of the strands is 0.019 inches. The wind-uplift reinforcements, e.g. the wind-uplift reinforcement patches 566 (such as but not limited to the wind-uplift reinforcement patches shown in FIGS. 15 and 16) or the wind-uplift reinforcement strips 568 (such as but not limited to the wind-uplift reinforcement strips shown in FIG. 17) are interposed between the bottom facer 564 and the bottom major surface of the baseboard core layer to coincide with a selected fastener pattern or selected fastener patterns for securing the cover board/insulation board/baseboard panel composite 560 to a roof deck and increase a per-fastener wind-uplift pull through rating for the cover board/insulation board/baseboard panel composite. The wind-uplift reinforcements of the cover board/insulation board/baseboard panel composite 560 perform the same or substantially the same function as the wind-uplift reinforcements of the cover board composite 520.

FIGS. 15 and 16 show an eight-fastener wind-uplift reinforcement patch placement pattern, utilizing a single patch and a double patch arrangement, for securing the cover board composite 520, the cover board/insulation board panel composite 540, and the cover board/insulation board/baseboard panel composite 560 to a roofing deck. The eight-fastener wind-uplift reinforcement patch placement pattern shown is exemplary and it is to be understood that the wind-uplift reinforcement patch placement patterns for the cover board composite 520, the cover board/insulation board panel composite 540, and the cover board/insulation board/baseboard panel composite 560 can be selected to accommodate any desired fastener placement pattern including any one or more of the fastener placement patterns commonly utilized in the roofing industry. In the embodiment shown in FIG. 15, single wind-uplift reinforcement patches 526, 546, and 566 are utilized. In the embodiment of FIG. 16, double wind-uplift patches 528, 548, and 568 are utilized with the overlying wind-uplift reinforcement patches having a 45° offset relative to the wind-uplift reinforcement patches overlaid. Preferably, the wind-uplift reinforcement patches 528, 548, and 568 are at least three inches by three inches and centered over each of the fastener placement locations. Examples of preferred wind-uplift reinforcement patches are: generally square patches that have dimensions between about three inches by about three inches and about six inches by about six inches; generally round patches that have diameters between about three inches and about six inches; and generally rectangular, oval and other shaped patches having a minor dimension between about three inches and about six inches and a major dimension between about three inches and about six inches. Preferably, the top surface of a cover board composite 520, a cover board/insulation board panel composite 540, or a cover board/insulation board/baseboard panel composite 560 utilizing the single or double wind-uplift reinforcement patches will be visibly marked to indicate the locations of the wind-uplift reinforcement patches on the underside of the composite so that a roofing installer will know exactly where to pass fasteners for securing the composite to a roof deck through the composite and the wind-uplift reinforcement patches located on the underside of the composite in the fastener placement pattern being utilized to secure the composite to a roof deck. For example, visible X and/or O markings could be placed on the top surface of a composite that are centered over the centers of each of the single or double wind-uplift reinforcement patches on the underside of the composite.

FIG. 17 shows a wind-uplift reinforcement strip placement pattern, which can be used for an eight-fastener placement or other fastener placement pattern, for securing the cover board composite 520, the cover board/insulation board panel composite 540, and the cover board/insulation board/baseboard panel composite 560 to a roofing deck. The wind-uplift reinforcement strip placement pattern shown for the wind-uplift reinforcement strips 528, 548 and 568 is exemplary and it is to be understood that the reinforcement strip placement patterns for the cover board composite 520, the cover board/insulation board panel composite 540, and the cover board/insulation board/baseboard panel composite 560 can be selected to accommodate any desired fastener placement pattern including any one or more of the fastener placement patterns commonly utilized in the roofing industry. Preferably, the wind-uplift reinforcement strips 528, 548 and 568 are between about three and about six inches wide, run the length and/or width of the composite, and have their longitudinal centerlines centered over fastener placement locations. Preferably, the top surface of a cover board composite 520, a cover board/insulation board panel composite 540, or a cover board/insulation board/baseboard panel composite 560 utilizing the wind-uplift reinforcement strips will be visibly marked to indicate the locations of the wind-uplift reinforcement strips on the underside of the composite so that a roofing installer will know exactly where to pass fasteners for securing the composite to a roof deck through the composite and the wind-uplift reinforcement strips located on the underside of the composite in the fastener placement pattern being utilized to secure the composite to a roof deck. For example, visible solid or dashed line markings or visible solid or dashed line markings with X and O markings in various fastener placement patterns could be placed on the top surface of a composite with the line markings centered over and extending along the longitudinal centerlines of the wind-uplift reinforcement strips on the underside of the composite.

Tests were conducted to determine fastener pull through strength for a 0.25 inch thick polyisocyanurate cover board: a) with only a coated nonwoven glass fiber bottom facer bonded to and substantially coextensive with the bottom major surface of the cover board; b) with a coated nonwoven glass fiber bottom facer bonded to and substantially coextensive with the bottom major surface of the cover board and a scrim reinforcement interposed between the bottom facer and the bottom major surface of the cover board and also substantially coextensive with the bottom major surface of the cover board; c) with a coated nonwoven glass fiber bottom facer bonded to and substantially coextensive with the bottom major surface of the cover board and six inch wide scrim reinforcement strips interposed between the bottom facer and the bottom major surface of the cover board, running the length of the cover board, and having longitudinal centerlines centered over the fastener penetration locations; d) with a coated nonwoven glass fiber bottom facer bonded to and substantially coextensive with the bottom major surface of the cover board and three inch wide scrim reinforcement strips interposed between the bottom facer and the bottom major surface of the cover board, running the length of the cover board, and having longitudinal centerlines centered over the fastener penetration locations; e) with a coated nonwoven glass fiber bottom facer bonded to and substantially coextensive with the bottom major surface of the cover board and six inch square scrim reinforcement patches interposed between the bottom facer and the bottom major surface of the cover board and centered over the fastener penetration locations; and f) with a coated nonwoven glass fiber bottom facer bonded to and substantially coextensive with the bottom major surface of the cover board and two layers of six inch square scrim reinforcement patches interposed between the bottom facer and the bottom major surface of the cover board and centered over the fastener penetration locations. The scrim material used in the tests was a fiberglass scrim having a tensile strength of 105 lbs per linear inch. The scrim material was 10 grams/ft$^2$ with 8×8 strands per inch wherein the mean diameter of the strands was 0.019 inches. The measured per fastener wind-uplift pull through strengths for these composites was:

a) coated nonwoven glass fiber facer alone—160 lbf (pounds of force);

b) coated nonwoven glass fiber facer and scrim reinforcement that is substantially coextensive with the bottom major surface of the cover board—300 lbf;

c) coated nonwoven glass fiber facer and six-inch wide scrim reinforcement strips—275 lbf;

d) coated nonwoven glass fiber facer and three-inch wide scrim reinforcement strips—250 lbf;

e) coated nonwoven glass fiber facer and six inch square scrim reinforcement patches—240 lbf; and f) coated nonwoven glass fiber facer and two layers of six-inch square scrim reinforcement patches—350 lbf.

The coverage rate of the scrim reinforcement (area of the bottom major surface of a cover board or other roofing panel composite covered by scrim reinforcement) for the scrim reinforcement embodiments set forth immediately above will vary with the fastener location pattern utilized. However, for the scrim reinforcement embodiments set forth immediately above, an eight fastener location pattern on a four by eight foot cover board or other roofing panel composite (i.e. a cover board or other roofing panel composite with a 32 ft² bottom major surface) results in the following coverage rates:

a) coated nonwoven glass fiber facer alone—0 ft² coverage;

b) coated nonwoven glass fiber facer and scrim reinforcement that is substantially coextensive with the bottom major surface of the cover board—32 ft² coverage;

c) coated nonwoven glass fiber facer and six inch wide scrim reinforcement strips—8 ft² coverage;

d) coated nonwoven glass fiber facer and three inch wide scrim reinforcement strips—4 ft² coverage;

e) coated nonwoven glass fiber facer and six inch square scrim reinforcement patches—2 ft² coverage; and f) coated nonwoven glass fiber facer and two layers of six inch square scrim reinforcement patches—2 ft² coverage with 4 ft² of scrim utilized.

With embodiment "f" (coated nonwoven glass fiber facer and two layers of six inch square scrim reinforcement patches—2 ft² coverage with 4 ft² of scrim utilized) a 90 pounds/ft² wind-uplift rating may be achieved for a cover board using only eight fasteners to secure the cover board whereas for embodiment "a" (coated nonwoven glass fiber facer alone) sixteen fasteners must be utilized to achieve a 90 pound/ft² wind-uplift rating for the cover board. Fasteners and their installation commonly represent approximately 40% of cover board installation costs. The scrim reinforcements of the subject invention enable a reduction in the number of fasteners required to achieve a specific wind-uplift rating for an installed cover board. Thus, for a roofing system with a specific wind-uplift rating, the scrim reinforcements of the subject invention can significantly reduce the labor and ultimately, the overall installed cost of the roofing system. Of course, an installer can retain the normal number of fasteners utilized per cover board and significantly increase the wind-uplift rating for the installed cover board. In addition, while the use of a scrim reinforcement that is substantially coextensive with the bottom major surface of a cover board or other roofing panel composite can significantly increase the per fastener wind-uplift pull through rating, the scrim reinforcement of the subject invention can substantially reduce the square footage of scrim reinforcement required to significantly increase the per fastener wind-uplift pull through rating (e.g. 32 ft² for full scrim reinforcement coverage vs. 8 ft², 4 ft², or 2 ft² coverage for reinforcements of the subject invention for an eight fastener location pattern on a four by eight foot cover board or other roofing panel composite).

In describing the invention, certain embodiments have been used to illustrate the invention and the practices thereof. However, the invention is not limited to these specific embodiments as other embodiments and modifications within the spirit of the invention will readily occur to those skilled in the art on reading this specification. For example, the prefabricated roofing panel composites could be in an upside down orientation to that shown and described in connection with FIGS. 7 to 9. Thus, the invention is not intended to be limited to the specific embodiments disclosed, but is to be limited only by the claims appended hereto.

What is claimed is:

1. A roofing system, comprising:
a plurality of insulation boards adapted for overlying a roof deck to form a layer of insulation, each of the plurality of insulation boards having opposing planar surfaces and having a facer on at least one planar surface, and said each of the plurality of insulation boards comprising polyisocyanurate foam having a first polyisocyanurate foam density; and
a plurality of cover boards adapted for overlying the layer of insulation, each of the plurality of cover boards having opposing planar surfaces and having a facer on at least one planar surface, and said each of the plurality of cover boards comprising polyisocyanurate foam having a second polyisocyanurate foam density greater than the first polyisocyanurate foam density, which greater polyisocyanurate foam density provides for a compressive strength to resist deformation.

2. The roofing system of claim 1, wherein the second polyisocyanurate foam density is between 6 lbs/ft³ and 25 lbs/ft³.

3. The roofing system of claim 1, wherein the second polyisocyanurate foam density is between 4 lbs/ft³ and 25 lbs/ft³.

4. The roofing system of claim 1, wherein the first polyisocyanurate foam density is less than 4 lbs/ft³.

5. The roofing system of claim 1, wherein the first polyisocyanurate foam density is between about 1 lbs/ft³ and about 3 lbs/ft³.

6. The roofing system of claim 1, wherein the facers comprise glass fiber.

7. The roofing system of claim 1, wherein each of the plurality of cover boards is bonded to a respective one of the plurality of insulation boards to form a roofing panel composite.

8. The roofing system of claim 1, further comprising a waterproofing membrane adapted for overlying the layer of cover boards.

* * * * *